(12) United States Patent
Brown et al.

(10) Patent No.: US 10,975,567 B2
(45) Date of Patent: Apr. 13, 2021

(54) EXTENDABLE SLEEVE FOR POURED CONCRETE DECK

(71) Applicant: Reliance Worldwide Corporation, Poway, CA (US)

(72) Inventors: Larry D. Brown, Poway, CA (US); James Cosley, Poway, CA (US); Dennis Hart, Poway, CA (US); Virgil O'Neil, Poway, CA (US)

(73) Assignee: RELIANCE WORLDWIDE CORPORATION, Atlanta, GA (US)

( * ) Notice: Subject to any disclaimer, the term of this patent is extended or adjusted under 35 U.S.C. 154(b) by 0 days.

(21) Appl. No.: 16/224,609

(22) Filed: Dec. 18, 2018

(65) Prior Publication Data

US 2019/0257082 A1    Aug. 22, 2019

Related U.S. Application Data

(60) Provisional application No. 62/609,215, filed on Dec. 21, 2017, provisional application No. 62/657,519, filed on Apr. 13, 2018.

(51) Int. Cl.
*E04C 2/52* (2006.01)
*E04B 5/48* (2006.01)
(Continued)

(52) U.S. Cl.
CPC .............. *E04B 5/48* (2013.01); *A62C 2/065* (2013.01); *E04B 1/948* (2013.01); *F16L 5/04* (2013.01); *F16L 5/10* (2013.01)

(58) Field of Classification Search
None
See application file for complete search history.

(56) References Cited

U.S. PATENT DOCUMENTS

| 4,663,204 A | 5/1987 | Langham |
| 5,103,609 A | 4/1992 | Thoreson et al. |

(Continued)

FOREIGN PATENT DOCUMENTS

| CA | 2174199 C | 12/1996 |
| CA | 2411094 C | 5/2003 |

(Continued)

OTHER PUBLICATIONS

International Search Report for PCT/US2018/066550 filed May 5, 2019 for applicant Reliance Worldwide Corporation.

*Primary Examiner* — Basil S Katcheves
(74) *Attorney, Agent, or Firm* — Stetina Brunda Garred and Brucker

(57) ABSTRACT

An improved cap and assembly is provided for a poured concrete deck. The improved assembly has a diaphragm seal over-molded to a top plate having a depending sidewall that is snap-fit to a base containing a fire ring. A tubular sleeve is connected to the over-molded top plate by snap fit connections to the sidewall and by threaded fasteners passing through sockets in the sleeve, sidewall and base. The over-molded diaphragm has a funnel shape. A first sleeve cap has depending positioning tabs that may be broken off to adjust the cap height relative to the sleeve, with an inwardly extending latching surface engaging the sleeve when the tabs are removed. A second cap has inwardly extending tabs that fit into channels on the sleeve fit between ridges on the sleeve when rotated to adjustably position the second cap on the sleeve.

19 Claims, 21 Drawing Sheets

(51) Int. Cl.
  *A62C 2/06* (2006.01)
  *E04B 1/94* (2006.01)
  *F16L 5/04* (2006.01)
  *F16L 5/10* (2006.01)

(56) References Cited

U.S. PATENT DOCUMENTS

| | | |
|---|---|---|
| 5,147,077 A | 12/1992 | Murota |
| 5,456,050 A | 10/1995 | Ward |
| 5,681,640 A | 10/1997 | Kiser |
| 5,834,535 A | 11/1998 | Abu-Isa et al. |
| 6,004,651 A | 12/1999 | von Montgelas et al. |
| 6,168,738 B1 | 1/2001 | Douchet et al. |
| 6,176,052 B1 | 1/2001 | Takahashi |
| 6,226,939 B1 | 5/2001 | Atkins et al. |
| 6,645,278 B2 | 11/2003 | Langille et al. |
| 6,694,684 B2 | 2/2004 | Radke et al. |
| 6,790,893 B2 | 9/2004 | Nguyen et al. |
| 6,862,852 B1 | 3/2005 | Beele |
| 7,080,406 B2 | 7/2006 | Radke et al. |
| 7,080,486 B2 | 7/2006 | Radke et al. |
| 7,877,941 B2 | 2/2011 | Fischer et al. |
| 8,146,305 B2 | 4/2012 | Cordts |
| 9,086,174 B2 | 7/2015 | McConnell et al. |
| 9,103,116 B2 | 8/2015 | McConnell et al. |
| 9,388,570 B2 | 7/2016 | Brown et al. |
| 9,476,199 B2 | 10/2016 | McConnell et al. |
| 2003/0105188 A1 | 6/2003 | Nguyen et al. |
| 2004/0016190 A1 | 1/2004 | Radke et al. |
| 2005/0022868 A1 | 2/2005 | Truss |
| 2006/0160927 A1 | 7/2006 | Surplice et al. |
| 2008/0014398 A1 | 1/2008 | Tueshaus et al. |
| 2011/0237711 A1 | 9/2011 | Herman et al. |
| 2012/0022201 A1 | 1/2012 | Zhvanetskiy et al. |
| 2012/0216791 A1 | 8/2012 | Munzenberger |
| 2012/0304979 A1 | 12/2012 | Munzenberger et al. |
| 2013/0068487 A1 | 3/2013 | Klein et al. |
| 2015/0121782 A1 | 5/2015 | McConnell et al. |
| 2015/0121783 A1 | 5/2015 | McConnell et al. |
| 2017/0073965 A1 | 3/2017 | McConnell et al. |

FOREIGN PATENT DOCUMENTS

| | | |
|---|---|---|
| CA | 2411274 C | 5/2003 |
| CA | 2743852 A1 | 12/2011 |
| DE | 102008031018 A1 | 7/2009 |
| DE | 102011105575 B3 | 9/2012 |
| EP | 0178063 B1 | 4/1986 |
| EP | 0151328 B1 | 6/1988 |
| EP | 0271487 A4 | 3/1989 |
| EP | 0486299 A1 | 5/1992 |
| EP | 0635088 B1 | 1/1995 |
| EP | 0839969 A1 | 6/1998 |
| EP | 0761755 B1 | 4/1999 |
| EP | 1273841 A1 | 1/2003 |
| EP | 1234012 B1 | 2/2008 |
| EP | 2273639 A2 | 12/2011 |
| FR | 2813370 A1 | 1/2002 |
| GB | 2471929 A | 1/2011 |
| JP | 20030110339 A | 11/2004 |
| WO | 9119540 | 12/1991 |
| WO | 0134724 A1 | 5/2001 |
| WO | 2003000823 A1 | 1/2003 |

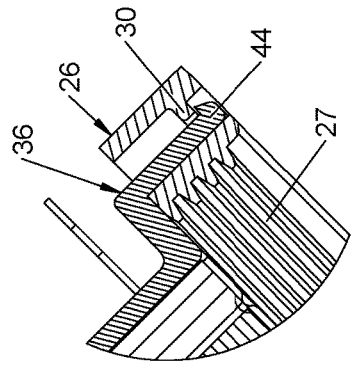
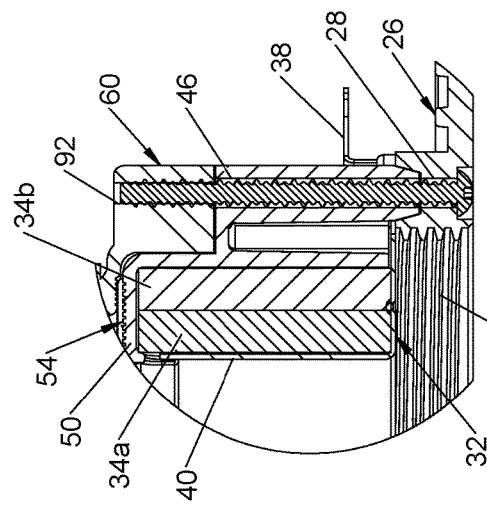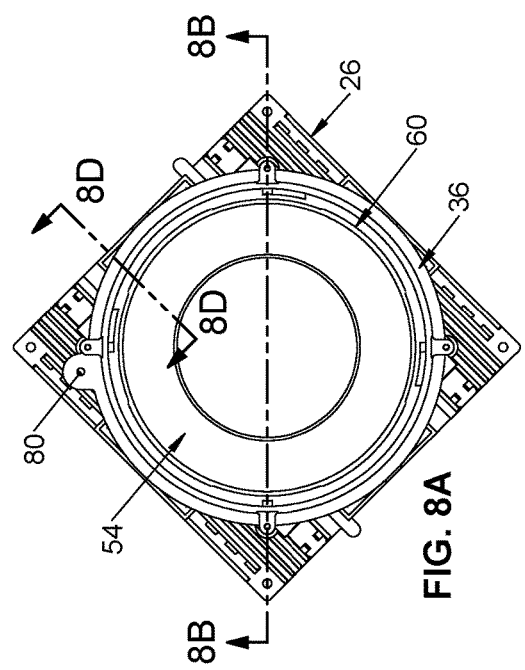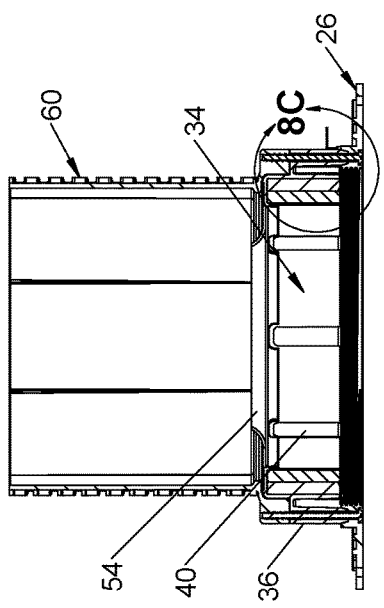
FIG. 8D
FIG. 8C
FIG. 8A
FIG. 8B

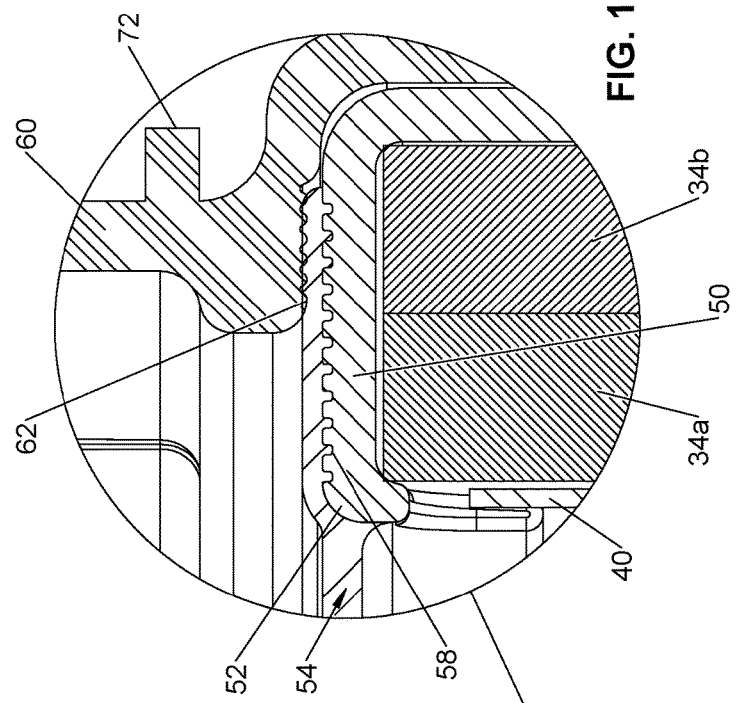
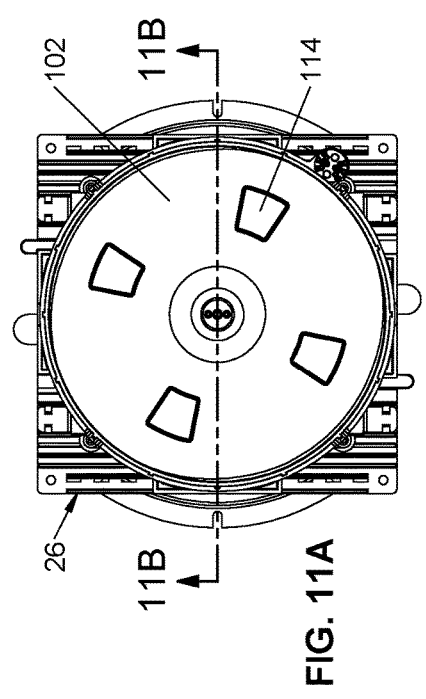
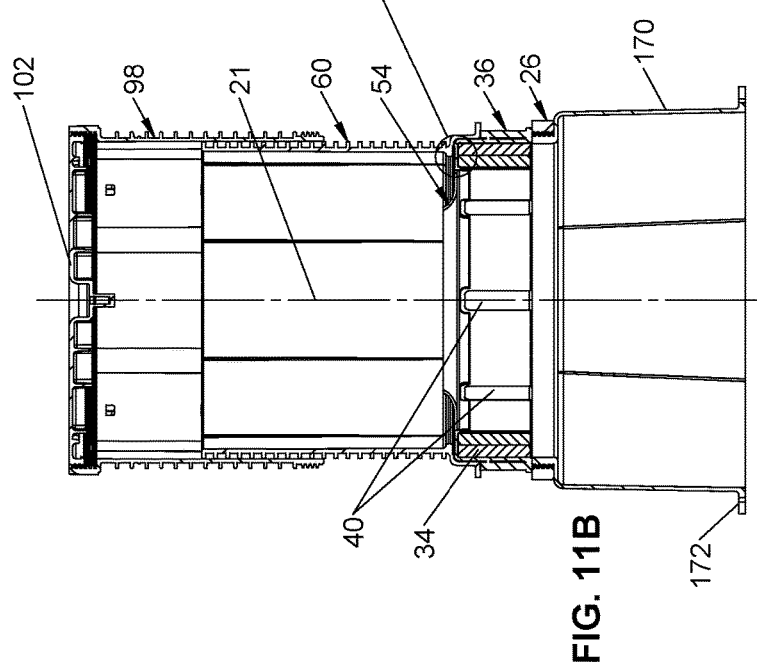

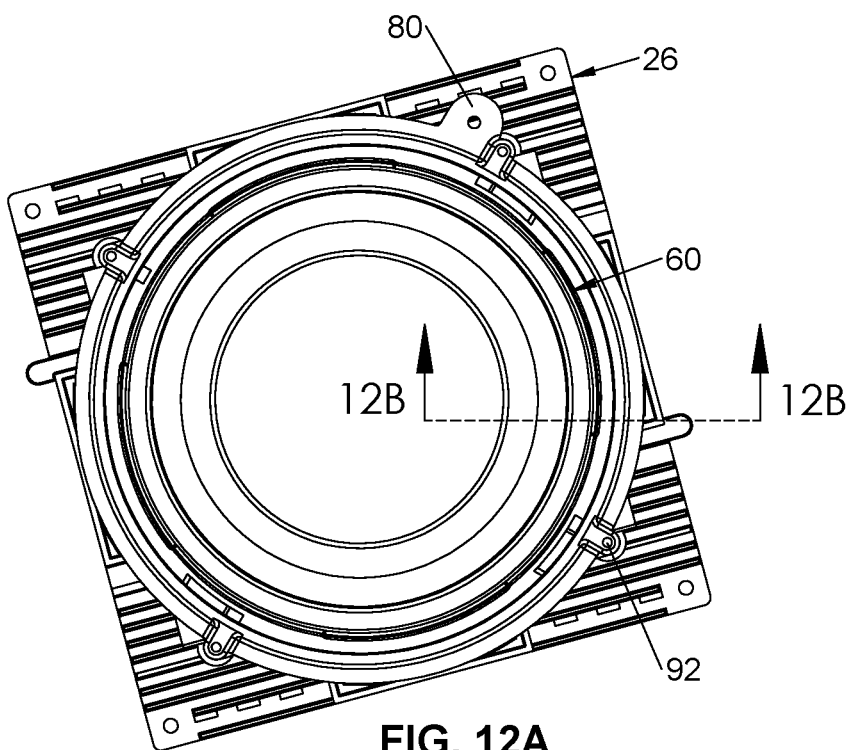
FIG. 12A
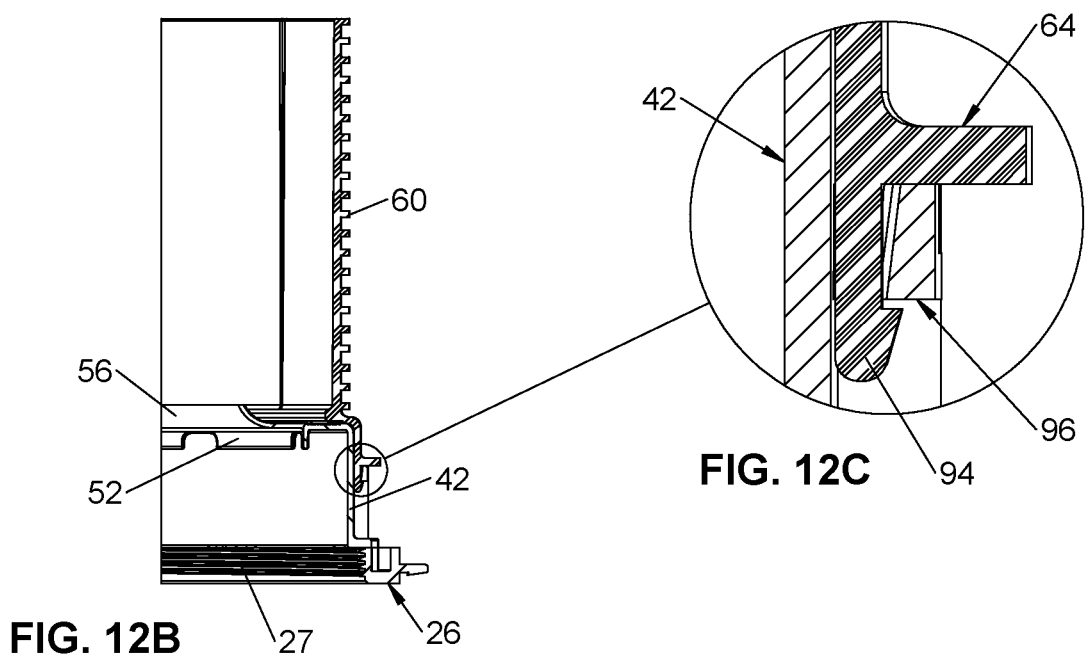
FIG. 12B
FIG. 12C

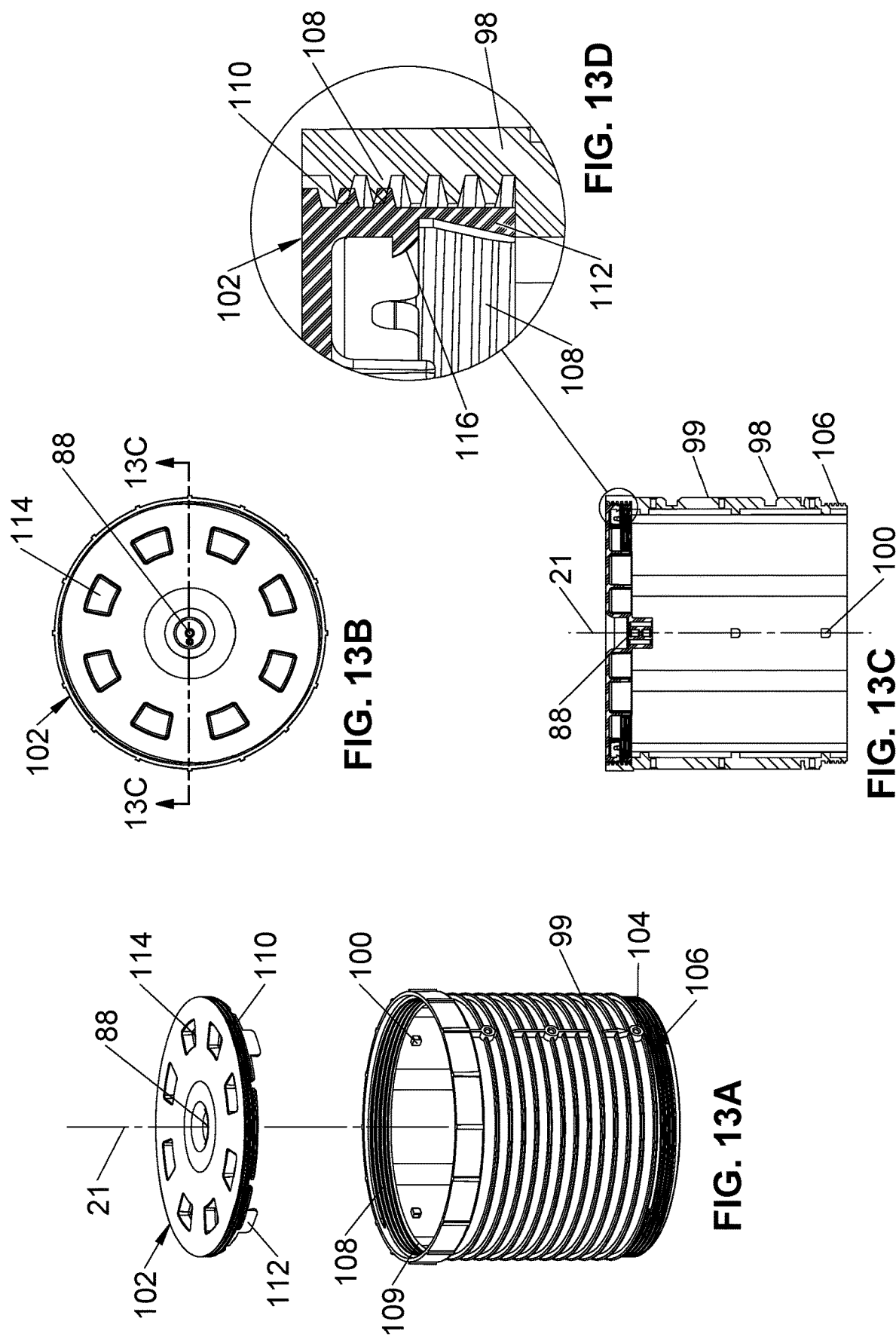

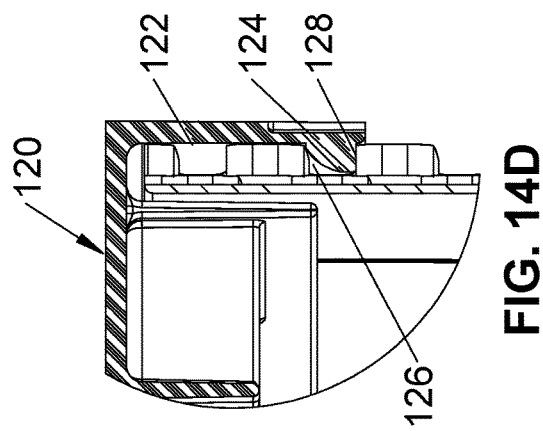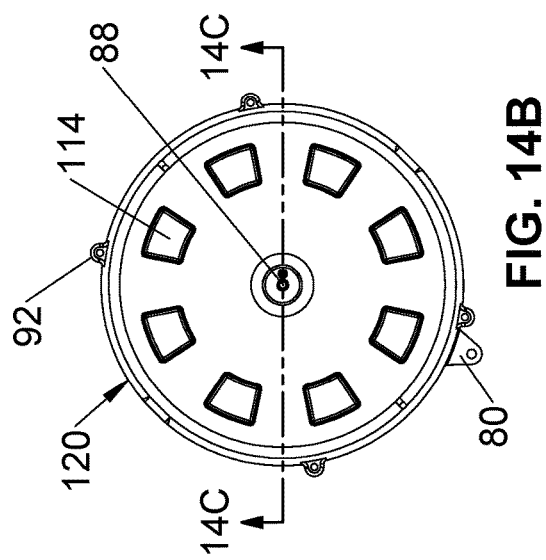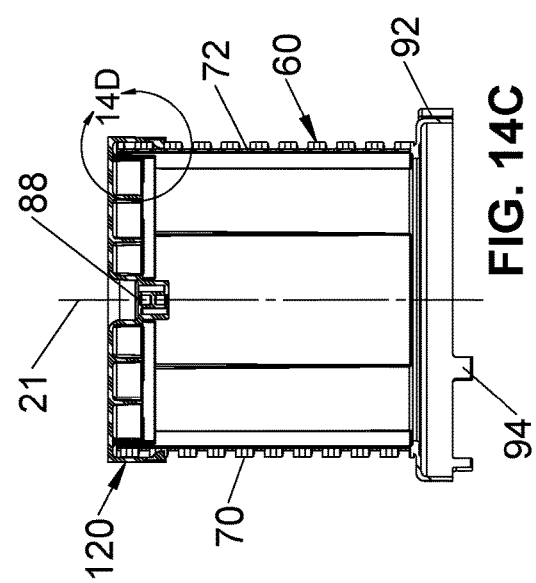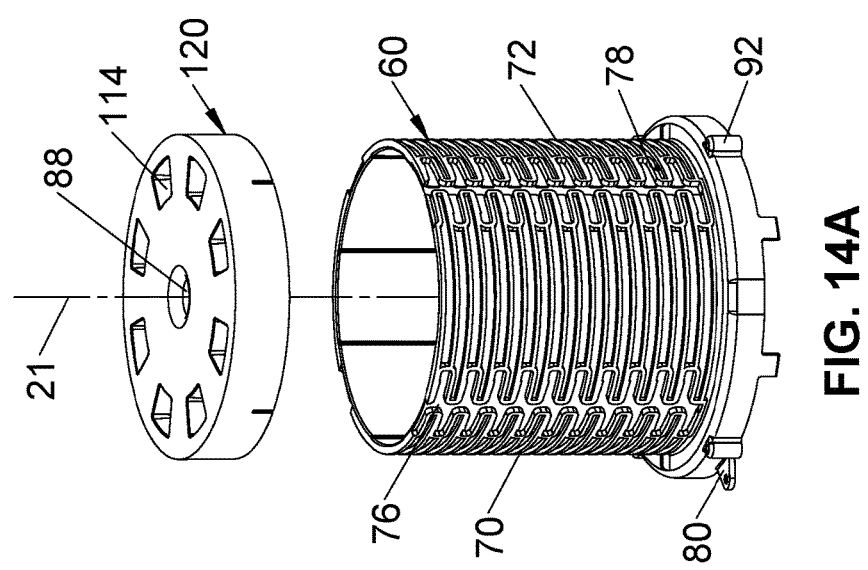

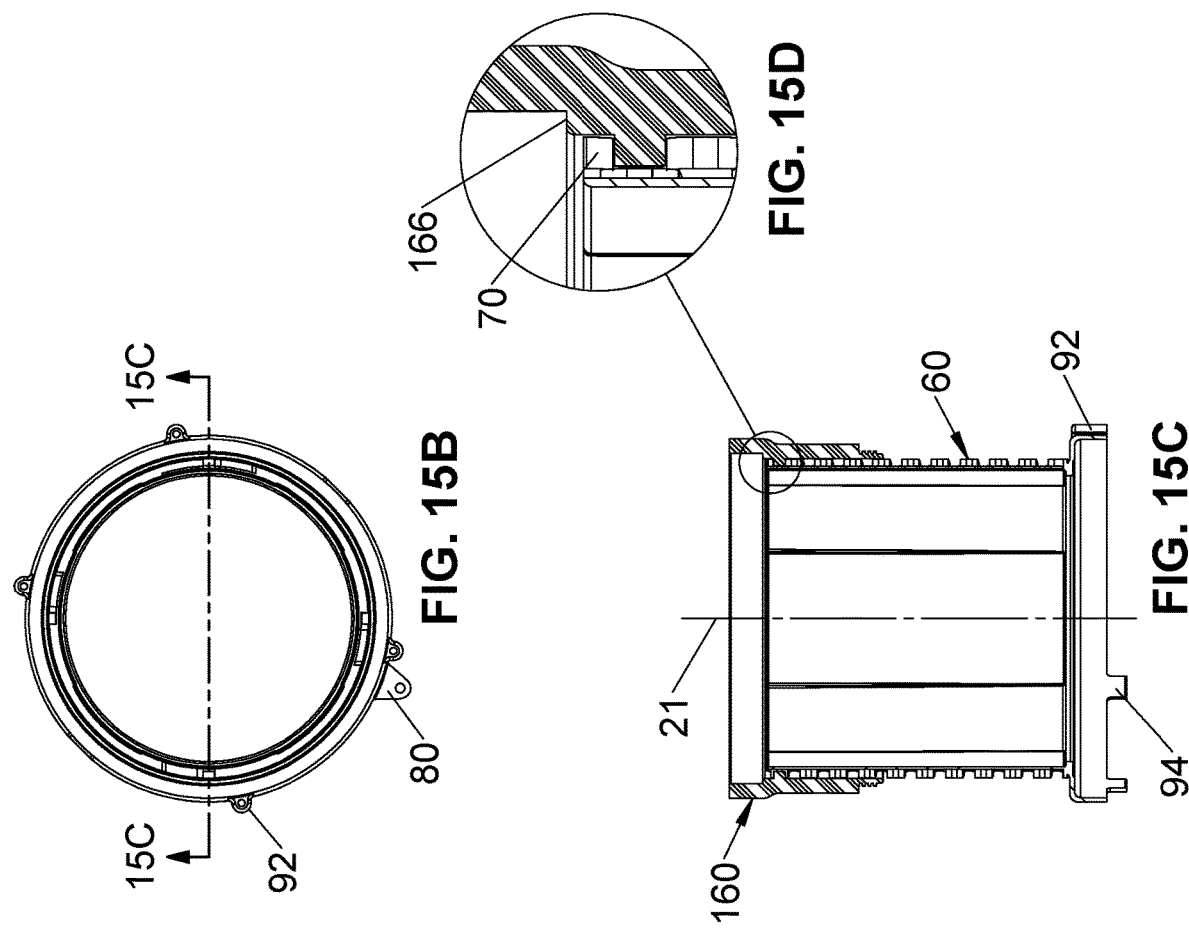
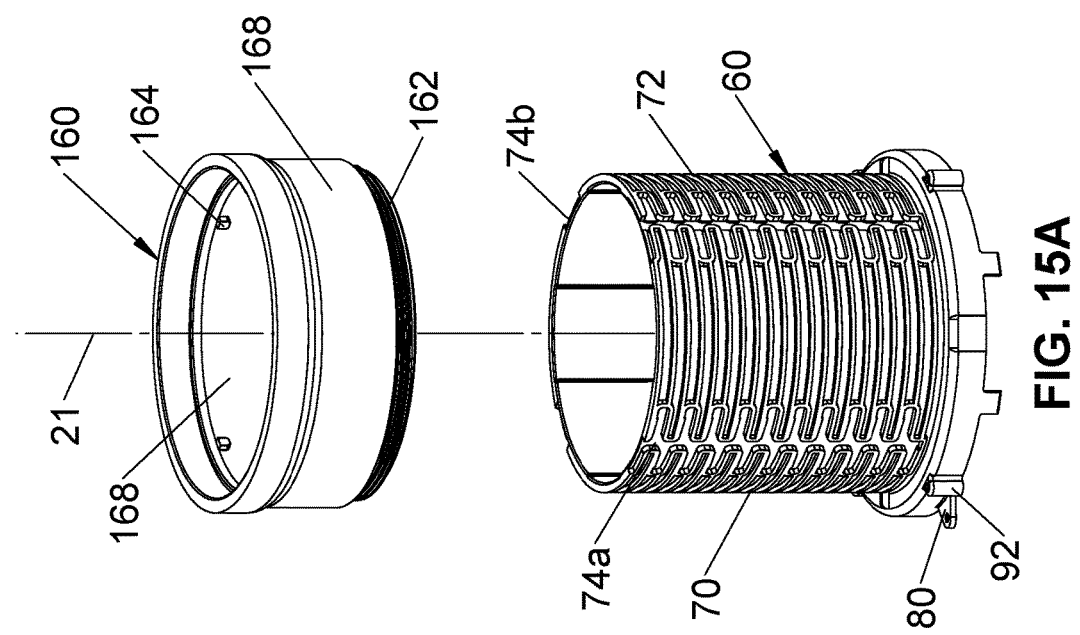

EXTENDABLE SLEEVE FOR POURED CONCRETE DECK

CROSS-REFERENCE TO RELATED APPLICATIONS

The application claims the benefit under 35 U.S.C. § 119(e) to Provisional Patent Application No. 62/609,215 filed Dec. 21, 2017, and Provisional Patent Application No. 62/657,519 filed Apr. 13, 2018 the entire contents of which are incorporated herein by reference.

STATEMENT RE: FEDERALLY SPONSORED RESEARCH/DEVELOPMENT

Not applicable.

BACKGROUND

An extendable tubular sleeve for poured concrete decks is described in U.S. Pat. Nos. 9,086,174 and 9,103,116. But that extendable sleeve uses a vertically-split base to connect to a metal frame that supports intumescent rings and that vertically-split base is cumbersome to assemble as it requires threaded fasteners to hold the parts securely together and it allows vertical misalignment of the vertically split parts of the base. Moreover, a flexible diaphragm is clamped between a top of the base and a sleeve that is threaded onto the base and the threading rotation of the sleeve can damage the flexible diaphragm and can also distort the diaphragm, thereby degrading the diaphragm performance and sealing with the pipe passing through the sleeve and diaphragm during use. For the above and other reasons, there is a need for an improved extendable sleeve that is faster and easier to assemble and that does not damage the diaphragm seal during use.

The extendable tubular sleeve is adjusted in length by cutting the inner sleeve to length and then putting on a cap to prevent concrete from entering the sleeve as the sleeve is entrained in concrete. But cutting the sleeve to length is time consuming, inaccurate and cumbersome. There is thus a need for an improved extendable sleeve that is easier to adjust in length.

Floor drain fittings are typically supported independently of the extendable sleeves that form the bulk of the fluid passage through concrete surfaces. This independent support is used because the floor drain fittings are very heavy and require sufficiently precise orientation and location that the extendable sleeves are not used to support the fittings. There is thus a need for an extendable sleeve that can be connected to and support a floor drain fitting for a poured concrete slab.

BRIEF SUMMARY

An improved cap and assembly is provided for a poured concrete deck. The improved assembly has a diaphragm seal over-molded to a top plate having a depending sidewall that is snap-fit to a base containing a fire ring. A tubular sleeve is connected to the over-molded top plate by snap fit connections to the sidewall and by threaded fasteners passing through sockets in the sleeve, sidewall and base. The over-molded diaphragm has a funnel shape. A first sleeve cap has depending positioning tabs that may be broken off to adjust the cap height relative to the sleeve, with an inwardly extending latching surface engaging the sleeve when the tabs are removed. A second cap has inwardly extending tabs that fit into channels on the sleeve fit between ridges on the sleeve when rotated to adjustably position the second cap on the sleeve.

There is also advantageously provided in improved cap for a tubular sleeve having a cylindrical wall extending along a longitudinal axis for forming a passage through a poured concrete deck. The tubular sleeve has a plurality of radially extending ridges separated into segments with a channel parallel to the longitudinal axis separating each segment. The channel has a circumferential width W with the external ridges spaced apart a predetermined distance Z along the longitudinal axis and the tubular sleeve has an inner diameter D. The improved cap may have a circular outer periphery with a generally flat top surface and a flange depending from the outer periphery of the cap and encircling the periphery of the cap. The flange has a bottom with at least one positioning tab extending inwardly from that bottom end of the depending flange. The positioning tab has a bottom surface that is orthogonal to the longitudinal axis during use and also has an inner surface that is inclined at an acute angle to the bottom surface so the inner surface faces toward an underside of the cap and toward the longitudinal axis. The positioning tab is advantageously curved and has the same curvature as the depending flange. The positioning tab may further have a width in the circumferential direction which width is smaller than W and also has an axial length which length is smaller than Z so the positioning tab may fit between two ridges of the sleeve and more easily slide axially off any ridge engaged by the inclined surface.

In further variations, the width of the positioning tab may be about W and the length may be about Z. Optionally, there are between two and six positioning tabs equally spaced about a circumference of the flange, with three or four positioning tabs preferred. The cap may also have an inner, depending cylindrical flange having an outer diameter about D but slightly smaller than diameter D of the sleeve so the inner flange fits inside the wall forming the tubular sleeve. The cap thus may advantageously have the diameter of the inner, depending cylindrical flange be about D but slightly smaller than diameter D for a snug fit with the cylindrical sleeve.

There is also provided a second cap for a tubular sleeve having a cylindrical wall extending along a longitudinal axis for forming a passage through a poured concrete deck. The tubular sleeve has a plurality of radially extending ridges, with a first of the plurality of ridges located an axial distance d from a distal end of the tubular sleeve that is closest to the first of the plurality ridges. The second cap has a circular periphery with a cylindrical, depending flange at the periphery and extending along the longitudinal axis during use. The depending flange has external threads thereon to engage extension tubes or other parts. The cap has a generally flat top surface to avoid excessive entrainment in concrete and avoid catching on concrete finishing tools. The second cap may also have at least two curved position stops depending from a bottom end of the depending flange in order to position the second cap a pre-determined distance above an abutting ridge or flange on the mating sleeve. The second cap advantageously has the depending flange connected to each position stop by a weakened area extending along the curvature of each position stop to make it easier to break off the position stop from the depending flange and thus lower the height of the cap by the axial length of the position stop. Each of the at least two position stops have the same axial length. The second cap advantageously has a lip on the inside of the depending flange and extending inward and located opposite the external threads. The lip may have an inclined bottom end facing downward and toward the longitudinal axis so as to more easily fit onto an outwardly extending flange. The lip has a flat surface opposite the inclined surface which flat surface is generally orthogonal to the longitudinal axis to form a catch with an outwardly extending flange. The flat surface is advantageously located an axial distance slightly greater than the distance d so the lip can engage the outwardly extending ridge on the top of the sleeve in a snap-fit or snap-lock engagement.

In further variations, the second cap may have from two to six position stops, each having an axial length of about 0.25 to about 1 inch and preferably, but optionally, equally spaced about a circumference of the depending flange. The cap may further include a plurality of wrenching recesses in the top surface of the cap.

There is advantageously provided a diaphragm seal assembly for use with a base connected to a tubular sleeve having a cylindrical wall with an internal diameter D. The sleeve extends along a longitudinal axis for forming a passage through a poured concrete deck. The assembly has a flexible diaphragm seal with a circular opening on the longitudinal axis sized to allow passage of an elongated member while flexibly engaging an outer surface of that elongated member. The diaphragm seal assembly includes an annular seal housing having a sidewall extending along and encircling the longitudinal axis and having an annular top plate extending inward toward the longitudinal axis with a central opening at the axis that is larger in diameter than the circular opening of the diaphragm seal. The top plate has a surface which is textured and which encircles the longitudinal axis. The flexible diaphragm seal has an inner diameter defining the circular opening and also has an over-molded outer diameter that extends over the textured surface and around the longitudinal axis so that textured surface and top plate are connected to the flexible diaphragm by over molding that outer diameter to that textured surface. This provides a unitary connection of the seal to the seal housing rather than a clamped assembly as in the prior art.

In other variations, the diaphragm seal assembly has the textured surface on a top surface of the top plate, although the textured surface could be on the bottom of the top slate with the flexible seal extending through the central opening of the top plate. The top surface and top plate advantageously extend radially inward, but could be inclined upward or downward.

The flexible diaphragm may have a funnel shape extending out of a plane orthogonal to the longitudinal axis through the textured surface when the diaphragm is in an undeformed condition, with the top plate inclined upward or downward, or with the top plate in a plane orthogonal to the longitudinal axis. The funnel shape may have straight walls forming a frusto-conical shape between the top plate and the inner diameter of the diaphragm. The frusto-conical shape may advantageously extend toward a distal end of the tubular sleeve during use. The funnel shape may have curved walls. The curved walls may extend toward a distal end of the tubular sleeve during use.

The diaphragm seal assembly may have the seal housing sidewall extends in an axial direction opposite the funnel shape, or extend in the same direction as the funnel shape. The seal housing sidewall may have a plurality of latch members extending parallel to the longitudinal axis in a direction away from direction in which the flexible diaphragm extends. The seal housing sidewall may be connected to a base extending along the longitudinal axis and enclosing a fire ring of intumescent material that encircles the longitudinal axis. The seal housing sidewall may also be connected to the base by a plurality of snap-lock connections. The snap-lock connections may include elongated latch members having barbed ends to engage catches in recesses on the base being preferred to connect the parts. But other male-female connections can be used. The assembly may also include a plurality of threaded fasteners connecting the seal housing sidewall to the base. The assembly may include the tubular sleeve, with a plurality of threaded fasteners extending between the tubular sleeve and the base. The assembly advantageously includes the tubular sleeve, with the tubular sleeve, seal housing sidewall and base each having a socket, and with a plurality of threaded fasteners extending through the sockets to connect the tubular sleeve, seal housing sidewall and base together.

Advantageously, the textured surface comprises a plurality of concentric grooves. Further, a top surface of the over-molded outer diameter may have a plurality of generally concentric grooves, axially opposite the textured surface. Advantageously, the assembly includes the sleeve and a bottom of the sleeve is textured, preferably with concentric ridges, which textured sleeve bottom abuts the over-molded outer diameter of the top plate.

There is also advantageously provided an assembly for forming a passage extending along a longitudinal axis through a poured concrete deck formed on a support surface and having an exterior deck surface. The assembly advantageously includes a base containing a fire ring encircling the longitudinal axis where the base has at least one fastener hole to connect the base to the support during use. A tubular sleeve having a bottom is connected to the base to form at least a portion of the passage through the deck during use. The sleeve has a top end with a first outer diameter D1. A floor fitting is connected to the sleeve. The floor fitting has a top flange extending away from the longitudinal axis and a bottom floor fitting tube with an outer diameter D2. The floor fitting has a center of gravity substantially centered on the longitudinal axis. A no-hub connector connects the sleeve to the floor fitting. The no-hub connector includes a tubular body having opposing top and bottom tubular body ends which are resiliently compressible. The bottom floor fitting tube extends inside the top tubular body end and the top end of the sleeve extends inside the bottom tubular body end to provide a fluid connection. A top ring clamp encircles the tubular body and compresses the top tubular body end against the bottom floor fitting tube. A bottom ring clamp encircles the tubular body and compresses the bottom tubular body end against the end of the sleeve. The ring clamps are typically hose clamps or other adjustable length, clamping fasteners. The base, sleeve and no-hub connector are self-supporting of the floor fitting so the floor fitting top flange is substantially perpendicular to the longitudinal axis, without the use of any braces, wires or support struts extending between the support on which the concrete is poured and the base, sleeve and no-hub connector.

In further variations, the assembly may include a first threaded fastener connecting the sleeve, top base and bottom base together along a first threaded fastener axis, and optionally connecting those parts to the support. The assembly may also include a second threaded fastener connecting the sleeve, top base and bottom base together along a second threaded axis, and preferably further connecting those parts to the support onto which the concrete is poured to form the deck.

In still further variations on this assembly, the tubular body is advantageously about 4 to about 8, and more preferably about 4 to 6 inches long. A stiffening sheath may be interposed between the ring clamp and the tubular body and encircling the tubular body. Advantageously, diameters D1 and D2 differ by no more than about 10%. Preferably, a single tubular sleeve extends between the base and the no-hub connector, but for thicker concrete decks the tubular sleeve may include a first tubular sleeve connected to the base and a second tubular sleeve connected to the no-hub connector, with the first and second sleeves being connected, preferably by threaded fasteners. The assembly may include any or all of the base and diaphragm variations described herein, including an upper and lower base connected together by snap-fit connections, with the sleeve connected to the upper base by snap-fit connections, or with the lower base is connected to a CD plate by at least one of a threaded fastener or a snap-fit connection.

The resulting concrete deck advantageously has the flange substantially parallel to and located at the exterior deck surface, with no supporting struts or wires in the concrete connecting the sleeve or floor fitting to the support. The absence of these supporting or stabilizing structures provides for a more uniform concrete interlock surrounding the passage through the concrete deck and avoids crack-inducing and rust-inducing struts, wires and braces passing as odd angles through the concrete to various parts of the tubular passage through the deck.

There is also advantageously provided a kit for forming a tubular passage for poured concrete decks formed on a support surface. The kit may include an upper base having a sidewall extending along and encircling a longitudinal axis and having an annular top plate extending inward toward the longitudinal axis with a central opening centered on that axis. The top plate advantageously has a textured surface encircling the longitudinal axis and an outer diameter of the top surface. A flexible and elastic diaphragm seal has an inner diameter defining a circular opening centered on the longitudinal axis and smaller in diameter than the central opening in the top plate. The diaphragm is connected to the top plate by over-molding an outer periphery of the flexible diaphragm to that textured surface. The kit also includes a lower base encircling the longitudinal axis and having fastener openings to fasten the lower base to the support during use. The upper base and lower base may have a plurality of aligned snap-fit connections to connect the lower base to the upper base during use. The kit also advantageously includes a tubular sleeve extending along the longitudinal axis during use. The tubular sleeve has a top end and a bottom end. The upper housing sidewall and the bottom end of the sleeve each have a plurality of aligned snap-fit connections to connect the sleeve to the upper base during use.

In further variations, the kit may include the various other parts described herein. The kit may include, for example, a corrugated deck plate, with the lower base and corrugated deck plate having a plurality of aligned snap-fit connections to connect the lower base to corrugated deck plate during use. The kit may advantageously include a no-hub connector and even a floor fitting. The no-hub connector may have a deformable tubular body with top and bottom opposing ends. A top and a bottom ring clamp are included with or on the no-hub connector and each ring clamp is sized to encircle the respective top and bottom end of the tubular body during use. The bottom end of the tubular body is sized to enclose and be tightened against the top end of the sleeve by the bottom ring clamp during use.

The kit may also have the tubular sleeve, upper base and lower base provided with a first socket which may be aligned along a first fastener axis, and each have a second socket which may be aligned along a second fastener axis. The kit also advantageously includes a first threaded fastener having a length sufficient to pass through the first sockets when they are aligned along the first fastener axis as well as including a second threaded fastener having a length sufficient to pass through the second sockets when they are aligned along the second fastener axis. The fastener length is sufficient to extend beyond the sockets a distance sufficient to fasten those connected parts together or to fasten those connected parts to a CD plate or to the support onto which concrete is poured to form the deck.

BRIEF DESCRIPTION OF THE DRAWINGS

These and other advantages and features of the invention will be better appreciated in view of the following drawings and descriptions in which like numbers refer to like parts throughout, and in which:

FIG. 8A is a top view of an assembly of the lower and upper base seal assembly and an inner sleeve;

FIG. 8B is a sectional view of the assembly of FIG. 8A, taken along section 8B-8B of FIG. 8A;

FIG. 8C is an enlarged portion of FIG. 8B, taken along section 8C-8C of FIG. 8B, FIG. 8D is an enlarged view of the lower right portion of FIG. 8B, showing a latch and catch connection between the upper base and seal assembly and the lower base assembly;

FIG. 11A is a top view of a first safety cap on an outer sleeve and showing a lower base;

FIG. 11B is a sectional view taken along 11B-11B of FIG. 11A showing a first safety cap on an outer sleeve, an inner sleeve, an upper base and seal assembly, a lower base and an aerator box below the lower base;

FIG. 11C is an enlarged view taken from FIG. 11B, showing how the inner sleeve may seal against the diaphragm on the upper base and seal assembly;

FIG. 12A is a top view of an inner sleeve on an upper base and seal assembly that is connected to a lower base;

FIG. 12B is a partial sectional view taken along section 12B-12B of FIG. 12A;

FIG. 12C is an enlarged view of a portion of FIG. 12B, showing how the inner sleeve may connect to the upper base and seal assembly;

FIG. 13A is an exploded perspective view of an assembly having an adapter to change diameter and extend the length of the sleeve assembly and a cap on the adapter;

FIG. 13B is a top view of the assembly of FIG. 13A;

FIG. 13C is a section of the assembly of FIG. 13A, taken along section 13C-13C of FIG. 13B;

FIG. 13D is an enlarged upper corner of FIG. 13C showing the cap engaging the adapter;

FIG. 14A is an exploded perspective view of an assembly having a second cap on the inner sleeve;

FIG. 14B is a top view of the assembly of FIG. 14A;

FIG. 14C is a sectional view of the assembly of FIG. 14A, taken along section 14C-14C of FIG. 14B;

FIG. 14D is an enlarged upper corner of FIG. 13C showing the second cap engaging the adapter;

FIG. 15A is an exploded perspective view showing the inner sleeve and a short, larger diameter adapter;

FIG. 15B is a top view of the assembly of FIG. 15A;

FIG. 15C is a sectional view of the assembly of FIG. 15A taken along section 15C-15C of FIG. 15B;

FIG. 15D is an enlarged view of the connection between the short adapter and the inner sleeve;

DETAILED DESCRIPTION

Figure 1:
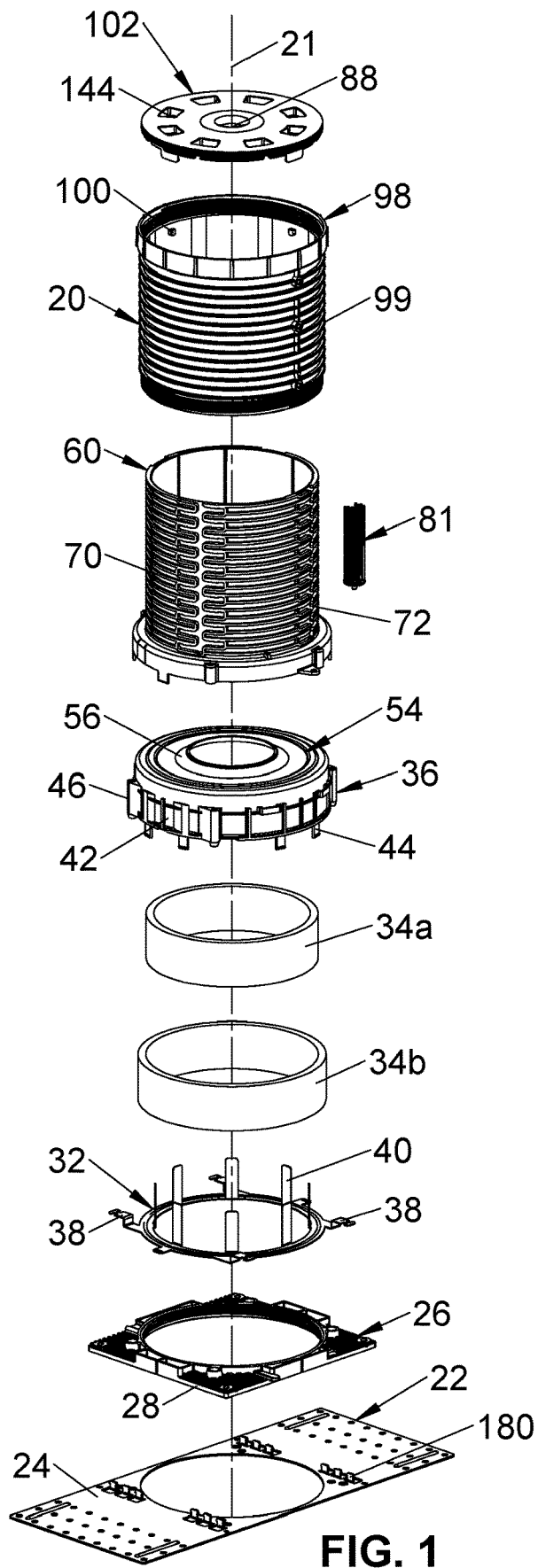
FIG. 1 shows an exploded perspective view of an expandable sleeve assembly.
Figure 2:
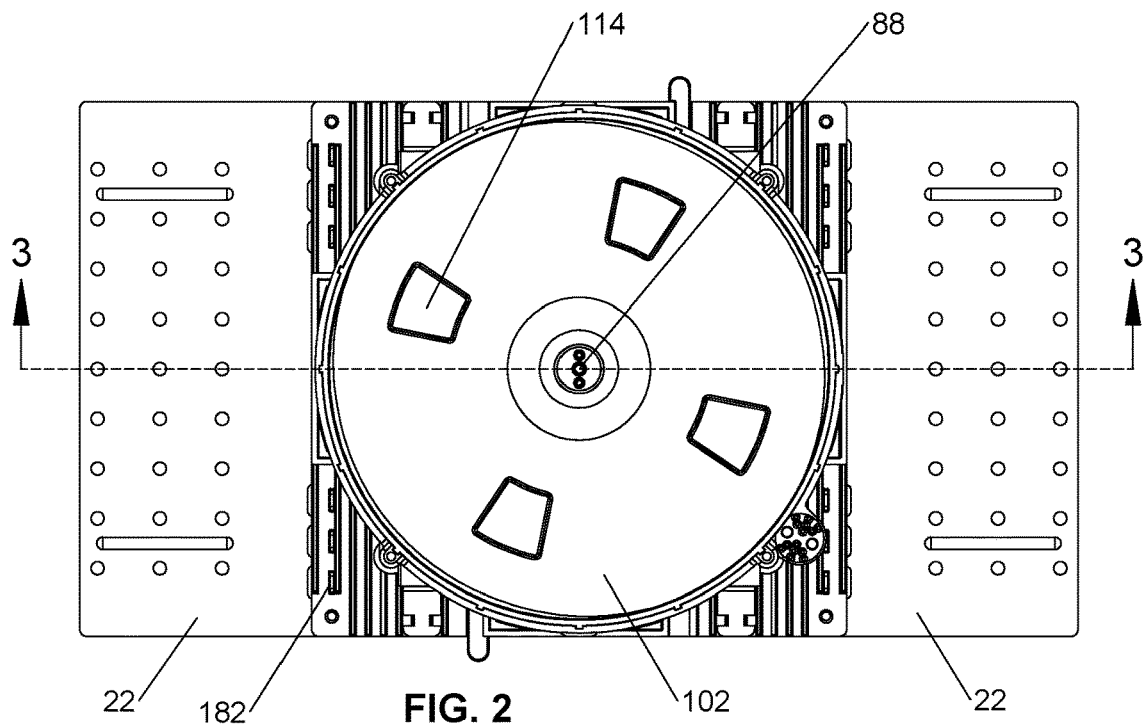
FIG. 2 shows a top view of the assembly of FIG. 1.
Figure 3:
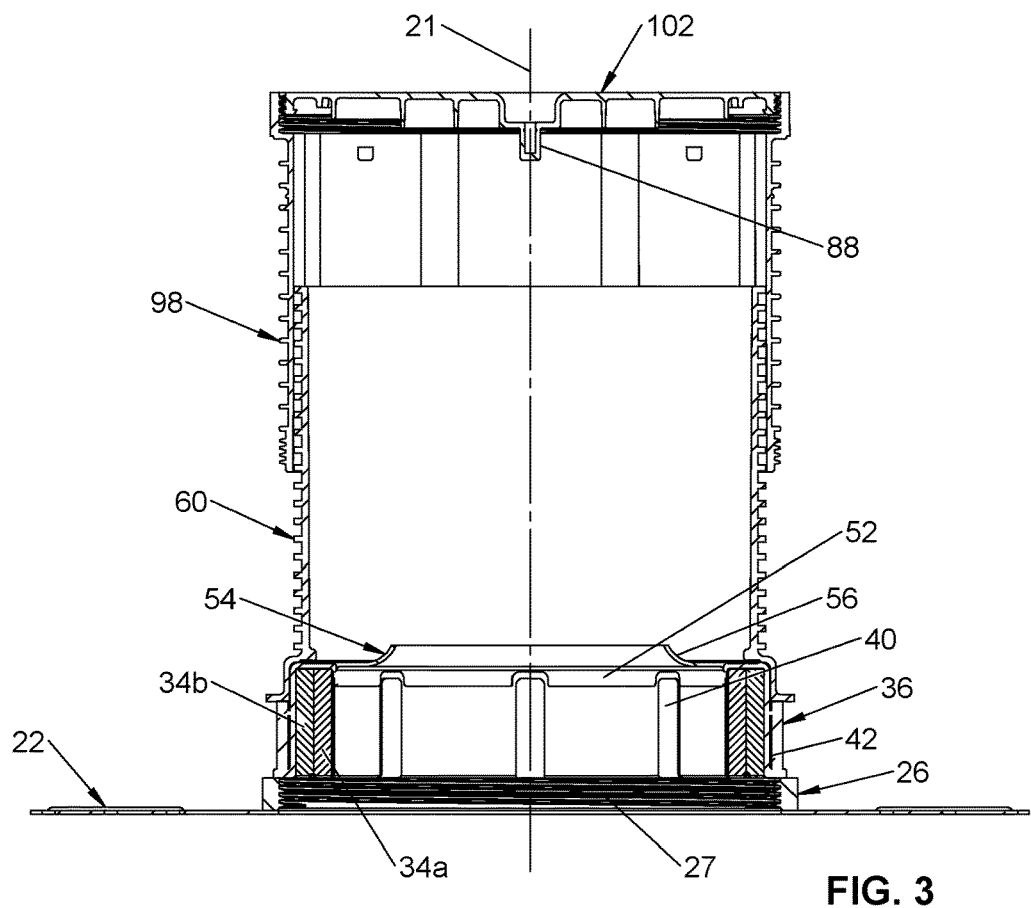
FIG. 3 shows a sectional view of the assembly of FIG. 1, taken along section 3-3 of FIG. 2.
Figure 4:
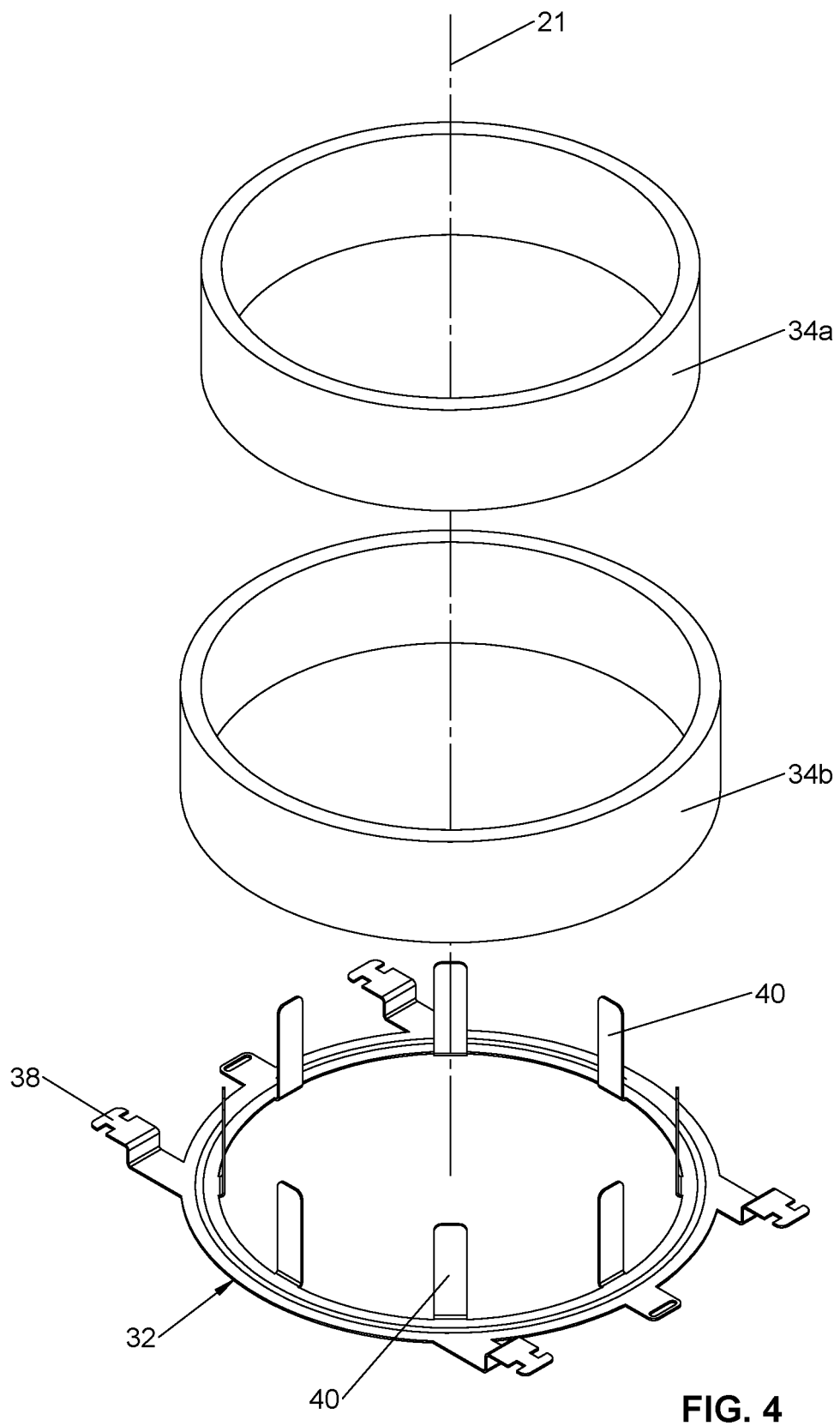
FIG. 4 shows an exploded perspective view of a fire ring and intumescent rings held within the fire ring.
Figure 5:
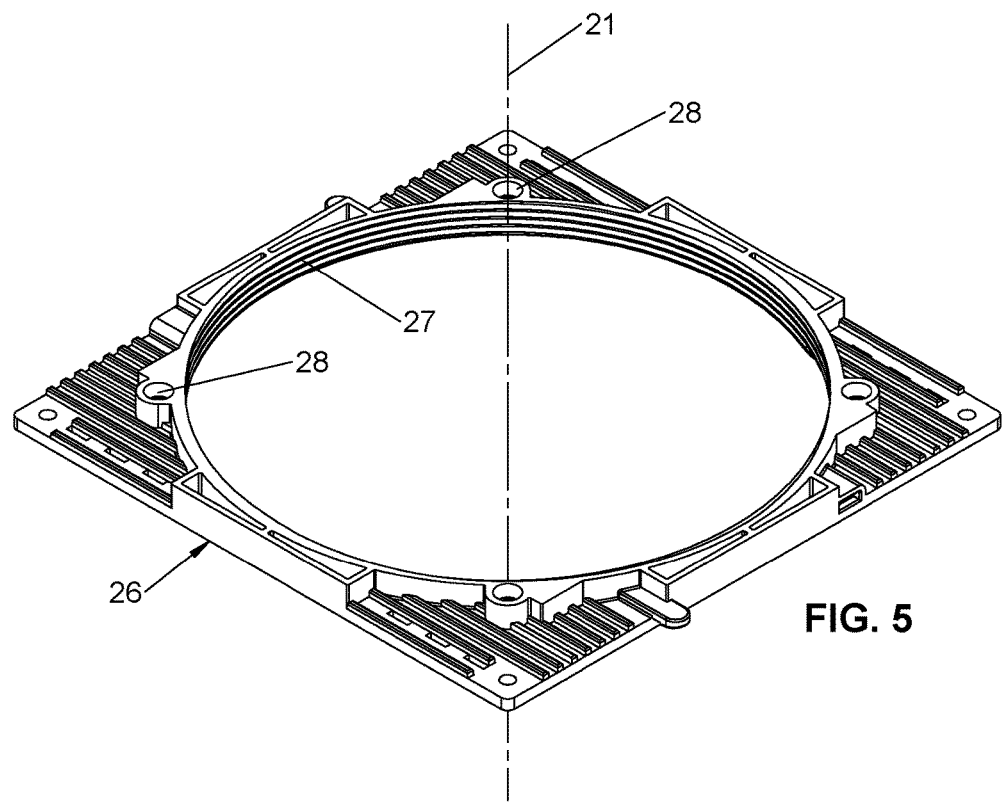
FIG. 5 shows a top, perspective view of a lower base.
Figure 6:
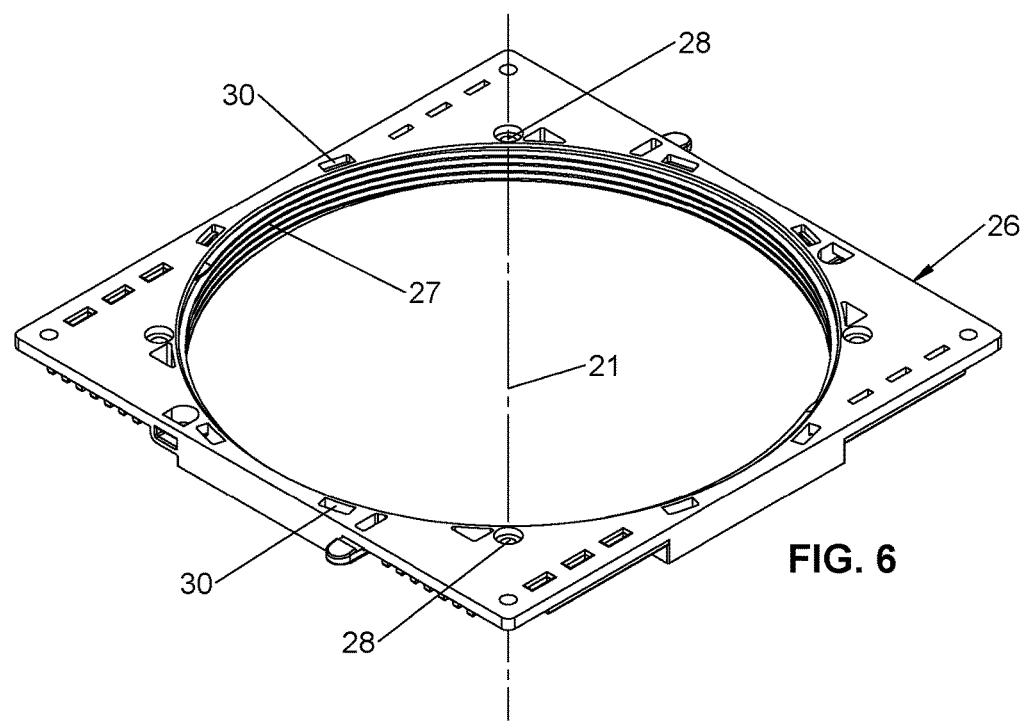
FIG. 6 shows a bottom perspective view of the lower base of FIG. 5.
Figure 7:
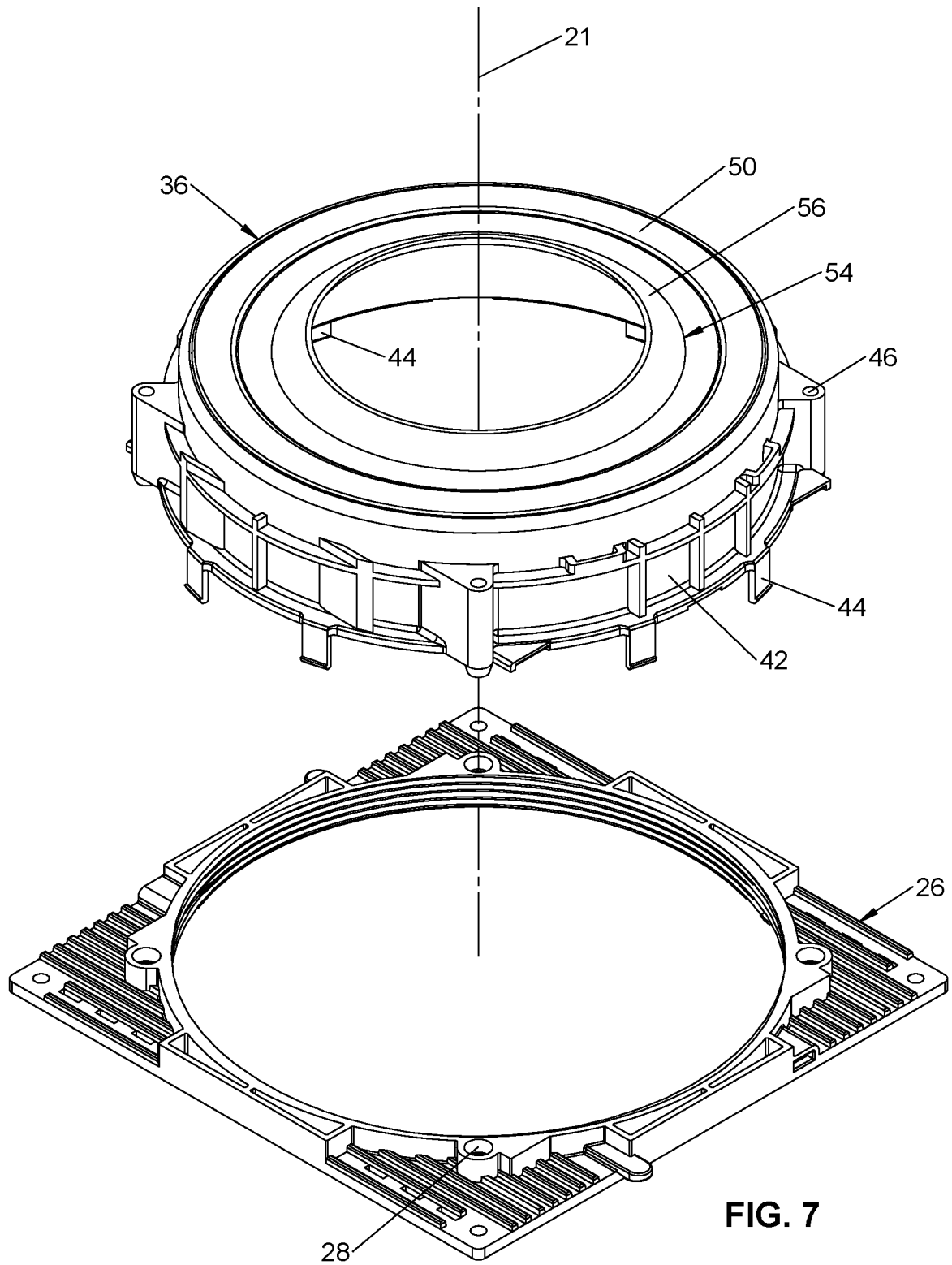
FIG. 7 shows an exploded perspective view of a lower base and upper base and seal assembly

As used herein, the following part numbers refer to the following parts: 20—extendable sleeve assembly; 22—CD Plate; 24—opening in CD plate; 26—lower base; 27—base threads; 28—socket in lower base; 30—catches in lower base; 32—fire ring; 34—intumescent members; 36—upper base and seal assembly; 38—ring tab; 40—fingers on ring; 42—flange; 44—latch; 46—upper base sockets; 50—top plate; 52—inner flange; 54—flexible diaphragm; 56—diaphragm sidewall; 58—indentations; 59—position stop; 60—inner sleeve; 62—base of inner sleeve; 64—sleeve flange; 66—sealing projections; 70—first set of ridges; 72—second set of ridges; 74a, 74b—channels; 76—end segments; 78—engaging protrusion on end segment 76; 80—whisker support; 81—whisker assembly; 82—whiskers; 84—whisker base; 86—male whisker connector; 88—female whisker connector; 92—inner sleeve socket; 94—sleeve latch members; 96—catch; 98—outer sleeve; 99—ridges; 100—engaging posts; 102—first safety cap; 104—radial sockets; 106—external threads; 108—internal threads; 110—external threads; 112—stop tab; 114—wrenching recesses; 116—lip on first cap; 120—second cap; 122—outer cap flange; 124—positioning tab; 126—inclined top surface; 128—bottom surface of tab; 130—inner cap flange; 140—floor fitting; 142—floor fitting tube or spigot; 144—top flange of floor fitting; 146—no hub connector; 148—ring clamps; 150—cylindrical body; 160—adapter; 162—external adapter threads; 164—positioning tabs; 166—outwardly extending portion; 168—larger diameter wall; 170—aerator box; and 172—flange on bottom of aerator box.

The depicted adjustable expandable sleeve assembly is configured for axial assembly using snap-fit connections, with optional threaded fasteners being used to further connect and secure the upper base to the lower base and tubular sleeve. As used herein, the relative directions up and down, upward and downward, above and below are with respect to the vertical axis when the expandable tubular sleeve assembly in vertically orientated for installation on a horizontal floor, as generally shown in the first figure showing the parts in an exploded view along the straight, longitudinal axis 21. The relative directions inward and outward are with respect to a longitudinal axis of the tubular sleeve assembly in the vertical orientation as shown in the first, exploded view of the drawings.

Referring to FIGS. 1-20, an extendable tubular sleeve assembly 20 extends along longitudinal axis 21 and is optionally connected to a corrugated deck ("CD") plate 22 which is preferably large enough to extend across corrugations of corrugated metal forms used for poured concrete floors. The CD plate has various openings 24. The plate 22 is shown as a rectangular plate with a large circular opening for a pipe and other components described later. The plate 22 is sturdy enough to support the extendable tubular sleeve on the corrugated form and is typically made of sheet metal with stamped perforations forming the openings 24. When the CD plate 22 is not used, the lower base 26 is fastened to another support, typically a plywood sheet. During use, concrete is poured onto the support to which the sleeve assembly 20 is fastened, entraining the sleeve assembly in the concrete. When the concrete hardens, a passage through the poured deck is formed by the sleeve assembly 20, allowing elongated members to pass through the deck, such as plumbing pipes, electrical conduits, electrical wires, fiber optic wires, etc. to pass through the hardened concrete deck.

The extendable sleeve assembly 20 may include a lower base 26, upper base and seal assembly 36, an inner sleeve 60, and either one of a first or second cap 102, 120, and optionally outer sleeve 98, as described later. The extendable sleeve assembly has a lower base 26 that is optionally connected to the plate 22 by threaded fasteners, such as screws, that pass-through openings 24 to fasten the base 26 and extendable sleeve assembly 20 to the corrugated form. The lower base 26 has a central opening for a pipe and several openings or lower base sockets 28 for receiving threaded fasteners and several openings forming catches 30 (FIG. 8D). The central opening is defined by a short flange encircling the axis 21, with base threads 27 on the flange and encircling the axis 21.

A fire ring 32 configured to hold one or more intumescent members 34 is held between the lower base 26 and an upper base and seal assembly 36. FIGS. 1, 4 and 11B-11C show two intumescent member 34a, 34b shaped as nested, concentric rings having a rectangular cross-section. The fire ring 32 is preferably of metal or other material that resists high temperatures. The fire ring is preferably a metal ring with a central opening and outwardly extending ring tabs 38 that are long enough to be entrained in concrete during use. A plurality of fingers 40 extend upward from the inner edge of the ring that defines the opening in the ring. The intumescent members 34a, 34b nest inside the fingers 40 with the fingers preventing lateral movement while the bottom of the intumescent members 34 rest on the annular base of the fire ring 32.

The upper base and seal assembly 36 may be referred to herein as upper base 36, with both names referring to the same construction. The upper base and seal assembly 36 has a downward depending flange 42 forming a seal housing sidewall, having a plurality of downwardly extending latches 44. The latches 44 are long enough to engage the catches 30 in the lower base 26 to connect the upper base and seal assembly 36 to the lower base 26 by axial motion (FIG. 1). The flange 42 forms a seal housing sidewall that fits around the outer periphery of the outer intumescent member 34b with the fire ring 32 sandwiched between the flange 42 of the upper base and seal assembly, and the lower base 26. Advantageously, the seal housing sidewall formed by sidewall 42 is preferably cylindrical and has a bottom that traps the outwardly extending ring tabs 38 between the bottom of the flange and the top of the lower base 26. A plurality of upper base sockets 46 are preferably formed on the outer periphery of the seal housing sidewall formed by sidewall 42 and have passages aligned with the sockets 28 in the lower base 26 so threaded fasteners can pass through the aligned sockets and secure the upper base and seal assembly 36 to the lower base 26 (FIGS. 8B, 8E). The sockets 46, 28 and threaded fasteners are optional.

The upper base and seal assembly 36 has an inwardly extending top plate 50 at the upper end of the of the assembly 36, with a depending inner flange 52 forming an opening that is preferably circular. The top plate 50 and inner flange 52 and outer sidewall of the upper seal assembly form an inverted, U-shaped cross-section. The top plate 50 extends over the top of the intumescent member 34 to restrain upward motion of the intumescent members 34a, 34b. The inner flange 52 is preferably a generally cylindrical flange (continuous or intermittent) and aligned with the fingers 40, or extends slightly inward of those fingers (FIG. 1). Thus, a pipe inserted from below the lower base will be guided by the fingers through the opening formed by the inner flange 52 without the edge of the pipe damaging the inner flange 52. A pipe inserted from above the lower base will be guided by the inner flange 52 so as to avoid an edge of the pipe engaging and damaging an end of the fingers 40.

Figure 9A:
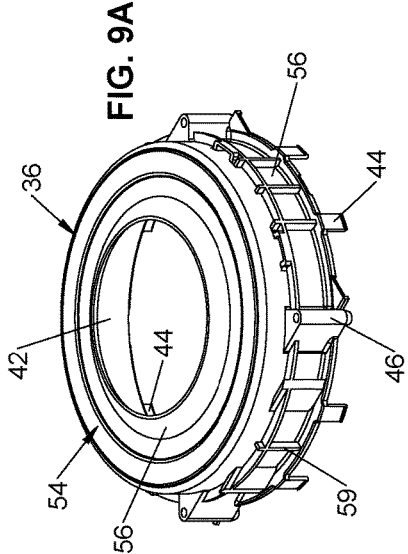
FIG. 9A is an upper perspective view of the upper base and seal assembly and its flexible diaphragm.
Figure 9B:
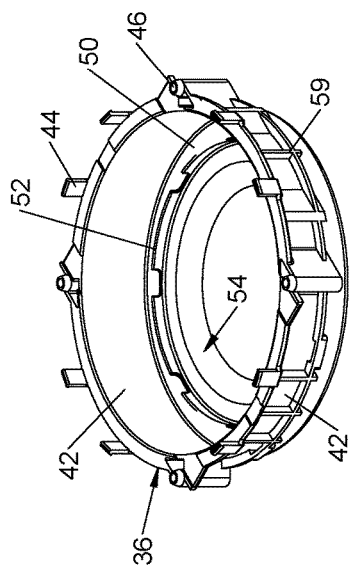
FIG. 9B is a lower perspective view of the upper base and seal assembly of FIG. 9A.
Figure 9D:
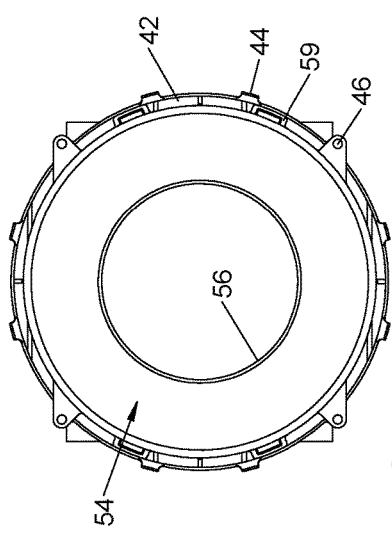
FIG. 9D is a top view of the upper base and seal assembly of FIG. 9C.
Figure 9C:
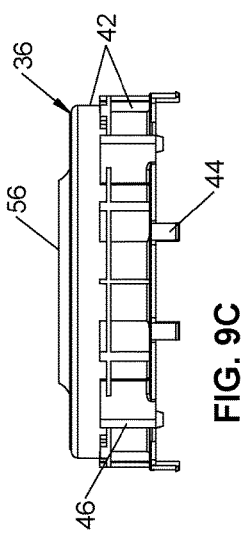
FIG. 9C is a side view of the upper base and seal assembly of FIG. 9A.
Figure 9E:
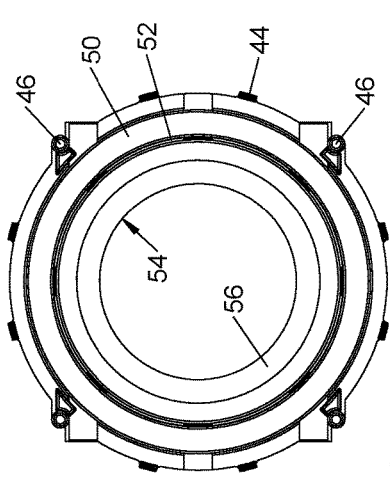
FIG. 9E is a bottom view of the upper base and seal assembly of FIG. 9C.
Figure 10A:
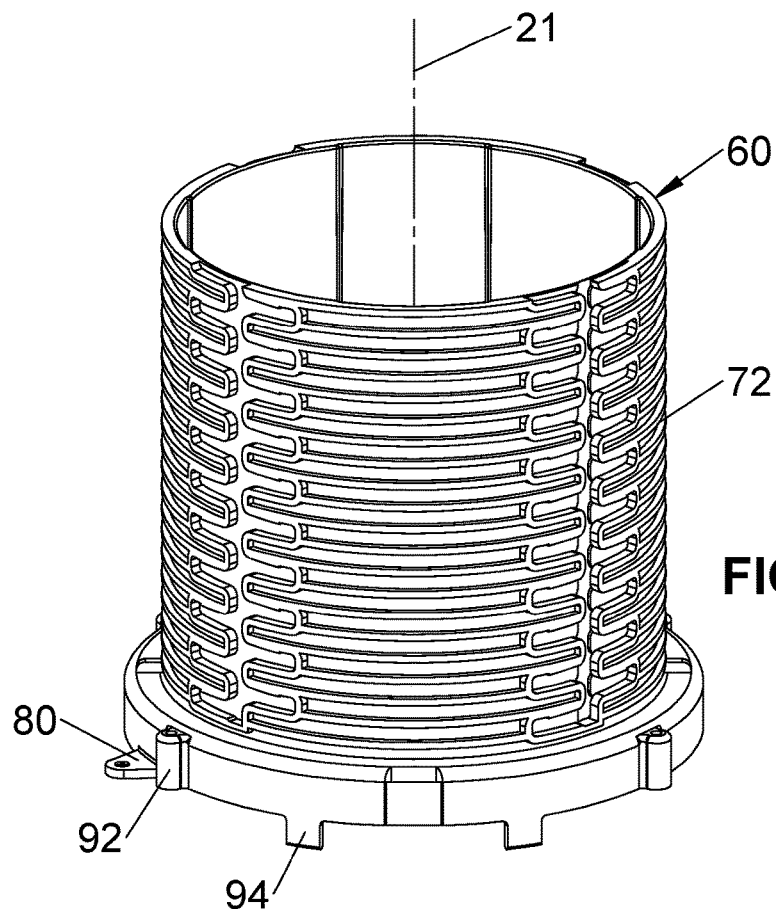
FIG. 10A is an upper perspective view of an inner sleeve.
Figure 10B:
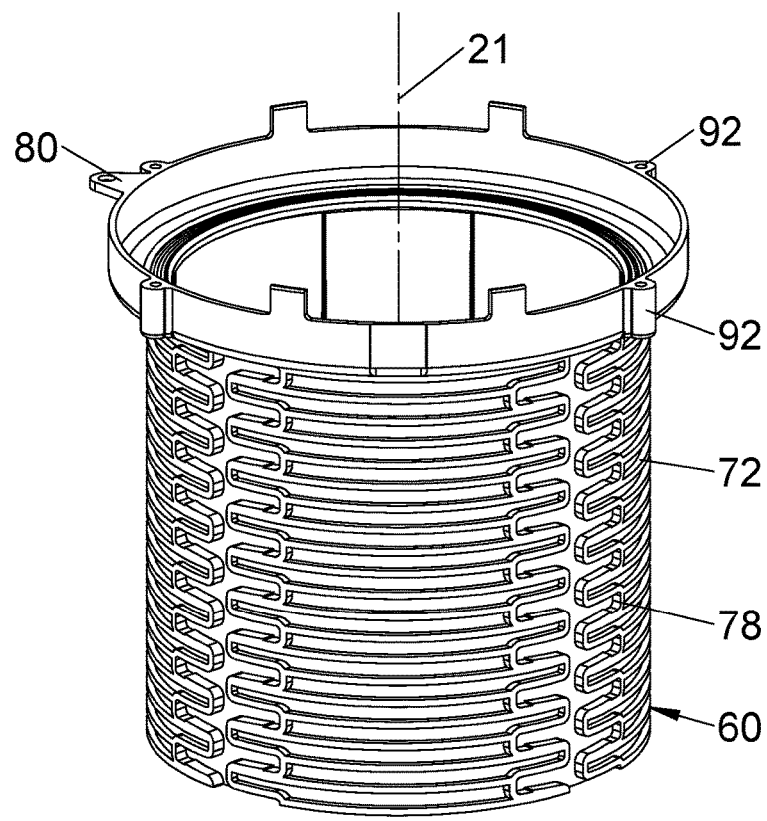
FIG. 10B is a lower perspective view of the inner sleeve of FIG. 10A.
Figure 10D:
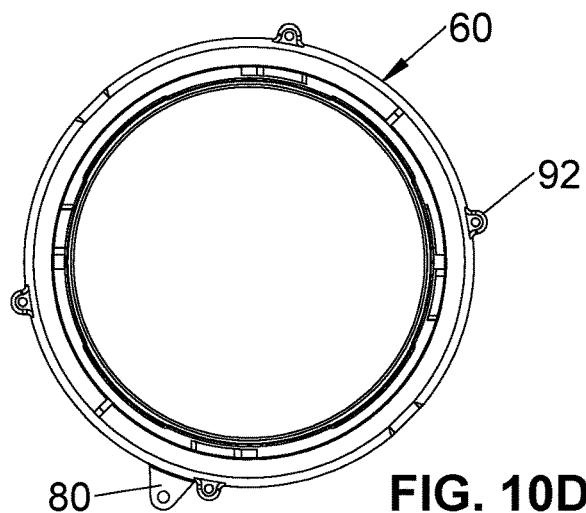
FIG. 10D is a top view of the inner sleeve of FIG. 10C.
Figure 10C:
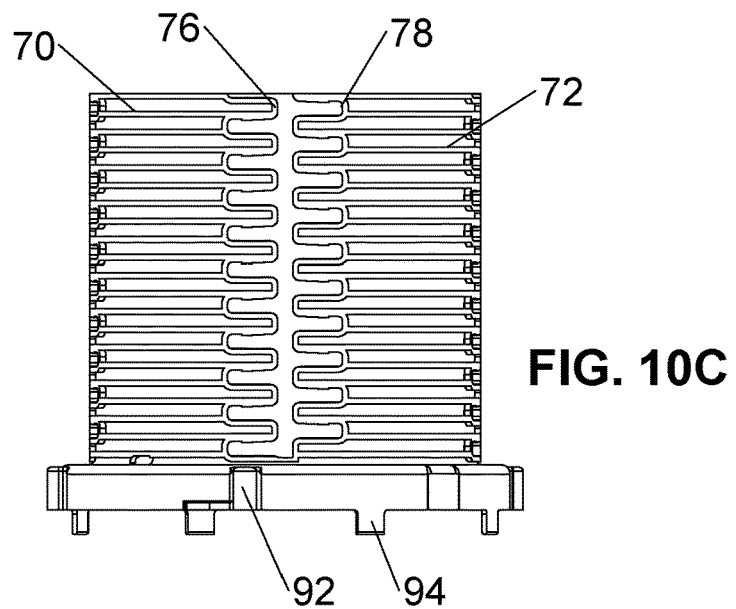
FIG. 10C is a side view of the inner sleeve of FIG. 10A.
Figure 10E:
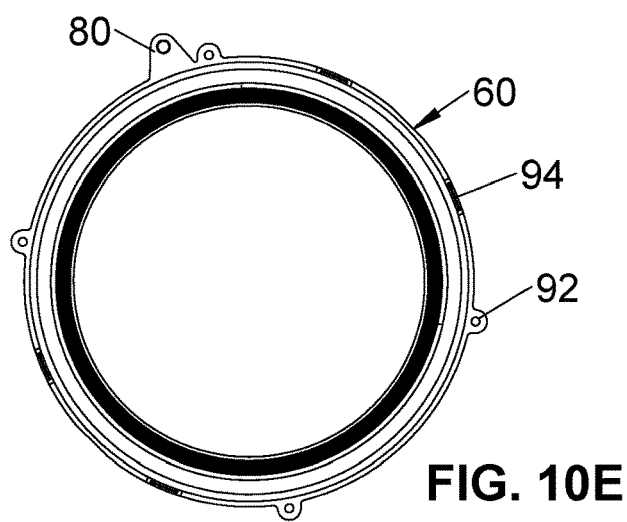
FIG. 10E is a bottom view of the inner sleeve of FIG. 10C.

A flexible diaphragm 54 is over-molded onto the top plate 50. The flexible diaphragm has an inner opening that is preferably circular and is formed of an elastic material, including neoprene, rubber, or other stretchable materials. The opening in the diaphragm 54 is preferably smaller than the intended outer diameter of pipe passing through the extendable sleeve assembly 20 is intended. The sleeve assemblies 20 are designed for various pipe diameters so the designed pipe diameter is known in advance. The diaphragm 54 preferably has a flexible, annular portion surrounding the opening in the diaphragm, with the opening advantageously being formed by a flat-sided, conical sidewall or formed by a curved sidewall 54 (FIGS. 9C, 11B). As best seen in FIG. 11C, the outer periphery of the top plate 50 may have concentric circular indentations or other indentations 58 forming a labyrinth pattern, with the outer periphery of the flexible diaphragm 54 being over-molded into those indentations. The indentations 58 and over-molding provide a labyrinth seal to help provide a fluid tight connection with the upper base 36 on the bottom side of the diaphragm 54. A position stop 59 (FIGS. 9A and 12E) extends (preferably axially) along a portion of the seal housing sidewall formed by sidewall 42 to help position an inner sleeve 60 as described later.

Referring to FIGS. 1, 10-12, 14, 15 and 17-19, an inner tubular sleeve 60 has a tubular, cylindrical shape, with a base 62 configured to rest on top of the outer portion of the upper base and seal assembly and also extend downward over the seal housing sidewall formed by sidewall 42. To improve the fluid seal between the base 62 of inner tubular sleeve 60 and the diaphragm 54, the bottom of the base 62 may have raised ridges 66, preferably comprising concentric circular ridges, that embed themselves in the more flexible material of the over-molded diaphragm 54, at the outer periphery of the diaphragm.

Figure 12D:
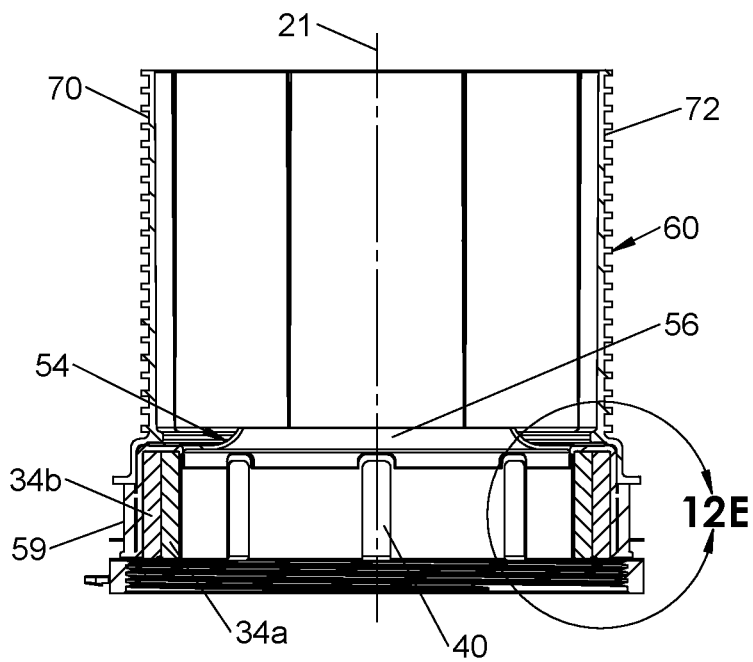
FIG. 12D is a full sectional view taken along section 12D-12D of FIG. 12A, showing a flange on the inner sleeve resting on a stop on the upper base and seal assembly.
Figure 12E:
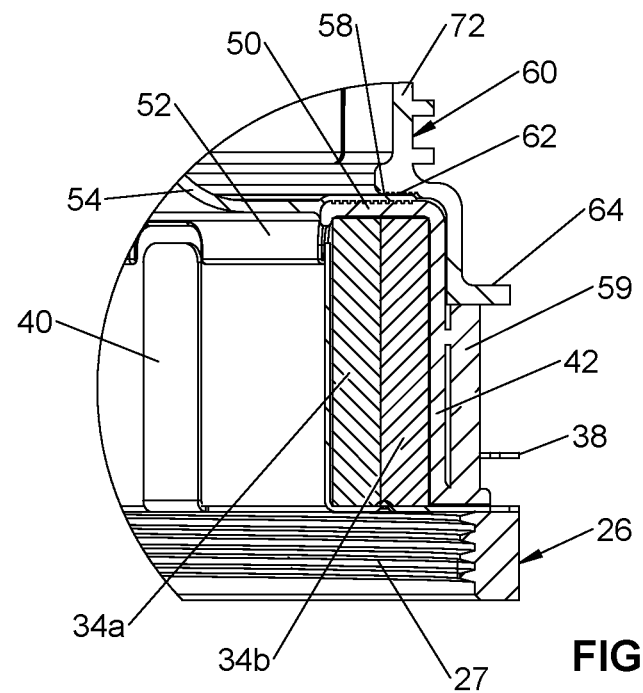
FIG. 12E is an enlarged portion of FIG. 12D showing the flange on the inner sleeve resting on a stop on the upper base and seal assembly.

Preferably, as seen in FIG. 12E, a radially outwardly extending sleeve flange 64 on a lower end of the tubular sleeve and base abuts position stop 59 on the seal housing sidewall formed by sidewall 42 of the upper base and seal assembly to position the inner tubular sleeve 60 axially relative to the upper base 36 and lower base 26.

The inner sleeve 60 has first and second sets of spaced-apart, outwardly extending ridges 70, 72 forming intervening slots between the respective ridges of each set. The first ridges 70 and intervening first slots each extend about half way around a first side or first partial circumference of the inner sleeve 60. The second set of ridges 72 and second slots between those second ridges extend about half way around the opposing, second side or second partial circumference of the inner tubular sleeve 60. The ridges 70, 72 on the first and second sides of the inner sleeve 60 are equally spaced apart about the distance of a saw blade used by construction workers. The first set of ridges 70 are offset from the second set of ridges 72, with the first set of ridges preferably being spaced in fractions of an inch and the second set of ridges being preferably spaced metrically, preferably in millimeters. Visible indicia (not shown) on the inner sleeve 60 discloses a distance from the bottom of the lower base 26 to each slot, or to the bottom of each ridge (70, 70) forming the slot, so that a worker can cut the inner sleeve 60 to desired, known length by cutting at a slot, with the saw blade guided by the opposing ridges 70, 72 on each side of the slot. The ridges may be viewed as graduations on the outside of the inner sleeve 60. The ridges 70, 72 and printed indicia identify a plurality of graduated distances from the bottom of the lower base 26. These ridges and grooves are known and described in more detail in U.S. Pat. No. 9,086,174 and U.S. Published Application No. 2015/0121783, the complete contents of which are hereby incorporated by reference.

The first and second sets of ridges 70, 72 and their intervening slots are in radially aligned planes extending orthogonal to axis 21. These sets of ridges 70, 72 are separated by first and second longitudinal channels 74a, 74b located on opposing sides of the inner tubular sleeve 60. As desired, the printed indicia may be located in one or both longitudinal channels 74a, 74b, or on the outer sides of inner sleeve 60 in the spaces between adjacent ridges 70, 72. The ends of two adjacent ridges 70 or two adjacent ridges 72 within each set of ridges may be joined by axially extending end segments 76 (FIGS. 10C, 18), with alternating pairs of ridges joined by offset end segments 76 that are offset circumferentially a short distance from end segments 76 each other to form staggered axial end connections. A latching protrusion 78 (FIGS. 14A, 17-18) may extend axially from or near the axially extending end segments 76 to form a snap lock connection described later. The ridges 70, 72 are parallel to each other with the ridges 70 being offset axially relative to the ridges 72. By cutting the inner sleeve 60 off at a particular ridge 70, 72, or the slot associated with that particular ridge, a user can determine the maximum height of the extendable sleeve assembly 20 and thus adjust the length of the sleeve Referring to FIGS. 10A-10B, 14A, 15A and 18, the inner tubular sleeve 60 optionally has one or more whisker supports 80 extending outwards from the sleeve 60, preferably at the bottom of the sleeve 60 and more preferably from the outer portion of the sleeve by the base 62. A whisker assembly 81 having a plurality of flexible, elongated whiskers 82 (FIGS. 20A-20B) mounted to a whisker base 84 having a male (protruding) whisker connector 86 on a bottom of the base, releasably fasten or connect to one of the whisker supports 80. The whisker supports 80 have a female (recessed) whisker connector 88. The whisker connectors 86, 88 releasably engage to hold the whisker assembly 81 to the whisker support 80. The male and female connectors 86, 88 may be on opposing parts (support 80 or whisker assembly 81) and of varying configurations to releasably engage. The connectors 86, 88 allow a user to manually attach a whisker assembly to the whisker support or manually remove the whisker assembly from the support. The whisker base 84 may optionally have one or more axial, through-holes so threaded fasteners may be used to optionally secure the whisker assembly to the safety cap 102 as described later.

Referring to FIGS. 10A-10B, 14A, 15A and 18, the inner sleeve 60 advantageously has at least one, and preferably has a plurality of inner sleeve sockets 92 connected to the bottom of the inner sleeve, preferably connected adjacent the base 62 and extending outward of the sleeve flange 64. The inner sleeve sockets 92 preferably align with the lower base sockets 28 and the upper base sockets 46 so threaded fasteners can pass through the aligned sockets and secure the inner sleeve 60, upper base 36 lower base 26 together (FIGS. 8B, 8E). The threaded fasteners through the aligned sockets also urges the sealing projections 66 against the outer periphery of the flexible diaphragm 54 to form and maintain a fluid tight seal between those parts. The sockets 28, 46 and 92 and threaded fasteners are optional, but preferable. The threaded fasteners passing through each set of aligned sockets 28, 49 and 92 advantageously extend along a fastener axis, with a different fastener axis extending along each set of aligned sockets and each fastener axis advantageously but optionally spaced symmetrically about the longitudinal axis or spaced equally around a common circumference centered on longitudinal axis 21. symmetrically Advantageously, one of the sockets 92 is immediately adjacent whisker support 80, at least one of which is vertically aligned with the channels 74 or end segments 76.

Extending outward from the bottom portion of the inner sleeve 60 are a plurality of sockets 92. The sockets 92 preferably have a passed therethrough sized to accept a threaded fastener. The sockets 92 preferably extend radially outward and at locations selected to align with sockets 28 in the lower base 26 and sockets 46 in the upper base and seal assembly 36. Threaded fasteners may pass through the aligned passages in the sockets 92, 46 and 28 to fasten together the outer sleeve 60, upper and lower bases 36 and 26. The threaded fasteners (FIGS. 8B, 8E) provided an increased stability and strength that helps maintain the integrity of the connected parts in the rough construction environment.

Depending downward from the bottom portion of the inner tubular sleeve 60, and preferably extending downward from the sleeve flange 64, are at least one and preferably a plurality of sleeve latch members 94. The sleeve latch members are located to axially engage recesses or catches 96 (FIGS. 12B-12C) formed in the upper base and seal assembly 36 to hold those parts together. In the depicted embodiments, the latch members 94 are male latch members with an outwardly facing barb and engage female catches 96 or female latch members having a ridge, lip or inwardly facing barb to engage the male latch member (FIGS. 12B-12C). The latches 94 and catches 96 allow axial movement of the inner sleeve 60 and upper base and seal assembly 36 to fasten the parts together using a snap-fit connection. The latches are preferably sufficient to hold the parts together for the intended use without the threaded fasteners passing through the sockets as described above.

Referring to FIGS. 11B and 13, an outer tubular sleeve 98 is optionally provided. The outer sleeve 98 is a tubular sleeve with ridges 99 extending outward from the exterior of the sleeve. If multiple extensions are to be used, the ridges 99 may comprise the sets of ridges 70, 72 described on the inner sleeve 60, or an extension may be threaded into the top end of the outer sleeve 98 using internal threads 108 described later. The ridges 99 are preferably circumferential ridges, equally spaced. The ridges 99 stiffen the sleeve and engage the poured concrete during use. The outer sleeve 98 is larger in diameter than the inner sleeve 60 and fits over the inner sleeve 60 to form nested, coaxial sleeves. For example, the inner sleeve 60 may have a 5-inch inner diameter and the outer sleeve 98 may have a 5.5-inch diameter. Advantageously, the whisker support 80 extends far enough away from the generally cylindrical wall of the inner sleeve 60 that the outer sleeve fits between the cylindrical wall of the inner sleeve 60 and the outer whisker assembly 81 when connected to the whisker support.

The outer tubular sleeve 98 has a plurality if engaging posts 100 extending radially inward. The engaging posts 100 are preferably aligned in vertical columns and spaced vertically apart a distance corresponding to the location of the end segments 76 and adjacent grooves 70, 72 forming those end segments, both on the inner sleeve 60, so the engaging posts can fit between the ends of adjacent grooves 70 or 72. The engaging posts 100 are vertically aligned in groups and each group of engaging posts 100 is spaced circumferentially apart a distance corresponding to the circumferential location of the channels 74. The number of groups of engaging posts 100 preferably corresponds to the number of channels 74, but may be as small as one group of vertically aligned engaging posts. In use, each group of engaging posts may be aligned with and moved vertically along a different one of the channels 74 until a desired height of the outer sleeve 98 and safety cap 102 is reached, at which point the outer sleeve and inner sleeve are rotated relative to each other so the engaging posts 100 fit between the adjacent ends 76 of a set of ridges 70 or 72. The ridges 70, 72 are slightly offset adjacent the end segments 76 and the latching protrusion 78 may engage and hold the engaging post in position. The offset allows the adjacent ridges 70 or 72 to guide a saw blade in the groove between the adjacent ridges, while the offset avoids the cut and allows enough structure to engage the engaging ends 100 and maintain the position.

A plurality of radially oriented sockets 104 are formed in the wall of the outer tubular sleeve and preferably have a radial passage extending through the socket. In use, a threaded fastener may be screwed through each radial socket 102 to secure the outer sleeve to the inner sleeve. The threaded fasteners extending through the radial sockets 104 provide a stronger connection than the engagement of the engaging posts 100 and ends of the adjacent ridges 70, 72. During use in construction, the extended sleeve assembly may be hit by workers or equipment from various directions and the threaded connection achieved by the radial sockets 104 helps maintain the height of the sleeve assembly once it is set.

The outer tubular sleeve 98 has external threads 106 on its lower end which can threadingly engage base threads 27 during use, and in that use the end of the outer sleeve 98 with threads 106 will be at the top of the outer sleeve 98 with the outer sleeve below the base 26. The outer sleeve 98 has internal threads 108 on its upper end, preferably formed on the inside of a slightly offset flange of slightly larger diameter than the outer sleeve 98. The slightly offset flange preferably forms a shoulder 109 (FIG. 13A, 13D).

Referring to FIGS. 1-3, 11B, and 13A-13C, a first cap, a safety cap 102, has external threads 110 on its outward facing edge and a plurality of depending, stop tabs 112. The external threads 110 are configured to threadingly engage internal threads 108 on outer tubular sleeve 98. The safety cap 102 is advantageously configured so its top surface is flush with the top of the outer sleeve 98 during use. The tabs 112 are sized so that when the top surface of the safety cap 102 is flush with the top edge of the outer sleeve 98, the ends of tabs 112 abut the flange 109. Thus, the flange 109 acts as a position stop for the tabs 112 and safety cap 102. There are preferably at least two stop tabs 112, and advantageously from two to eight stop tabs 112, each stop tab extending an axial distance of about 0.25 to 1 inch. The external threads 110 are few in number and preferably comprise multiple lead threads, such as double lead threads that extend about three times around the circumference of the cap. The safety cap 102 has a plurality of wrenching recesses 114 so a wrenching tool (not shown) can engages the recesses and remove the cap after the extendable sleeve is encased in concrete. The safety cap 102 has a female whisker connector 88 in its top surface, preferably in a centrally located recess, so that whisker assembly 81 may be connected to the top of the safety cap 102.

In some cases, the concrete is very thin and a very low height is required for the inner extension tube 60. In order to accommodate thin slabs 2.5-3.5 inches thick, the first cap 102 has external threads 110 that are few in number, preferably about 3-4 complete threads. The stop tabs 112 may be broken off so that the height or thickness of the first cap along axis 21 is the same as that of the flange containing the 3-4 threads. Referring to FIG. 13D, the first cap has an inwardly extending lip 116 having an inclined lower surface and a flat top surface to form a catch. The lip 116 can be continuous or intermittent. The inner sleeve 60 is cut to the desire length and the first cap 102 pushed over the open end of the sleeve, with the lip 116 located to engage one of the ridges 70, 72 extending outwards from the first sleeve 60. The lip 116 is located a distance from the inside surface of the top of the first cap 102 so that the lip 116 can engage one of the ridges 70, 72. This leaves the external threads 110 exposed to the concrete and those threads are entrained in the poured concrete. After the concrete hardens, a pipe may be pushed from the bottom of the sleeve assembly upward against the inside surface of the first cap 102 with enough force to either disengage the lip 116 from the engaged ridge 70, 72, or to shear the lip off, or to deform the lip enough that the cap can be removed from the hardened concrete.

As best seen in FIG. 13D, the lip 116 on the inside of the depending flange of the cap 102 extends inward and is located opposite the external threads 110. The lip 116 has an inclined bottom end facing downward and toward the longitudinal axis 21 so a ridge 70, 72 of a tubular sleeve can more easily slide past the lip to engage the catch formed by an orthogonal surface on the lip. The flat surface forming the catch is located an axial distance from the bottom, inside surface of the cap sufficient to engage and catch one of the ridges 70, 72. Thus, if the ridges 70, 72 are located a distance d from the adjacent distal end of the tubular sleeve from which the ridges extend, the flat surface of the lip 116 forming the catch is located a distance slightly greater than the distance d (to account for the thickness of the ridge 70, 72) to engage the closest of the ridges during use when the cap 102 is placed onto the tubular sleeve having such ridges.

In use, the intumescent material 34 is placed on the fire ring 32, guided by fingers 40. The fire ring 32 and intumescent material 34 is placed on the lower base 26 and then the upper base and seal assembly 36 is placed over the intumescent material 34 and latches 44 on the upper base assembly 36 engage catches 30 in the lower base to fasten the upper and lower bases together, trapping the fire ring and intumescent material between the upper and lower bases. The latches 44 engage catches 30 through relative axial movement of the upper base and seal assembly 36 and the lower base 26. The inner tubular sleeve 60 is placed over the upper base and seal assembly 36 and latches 94 on the inner sleeve 60 engage catches 96 on the upper base and seal assembly 36 as seen in FIG. 12C, to connect the inner sleeve to the upper base—through relative axial movement of the parts. The latches 94 and catches 96 hold the sealing projections 66 against the outer periphery of the diaphragm 54 to provide a fluid tight seal. Optional but preferably threaded fasteners pass through sockets 28, 46, 92 (FIGS. 8B, 8E) to secure the upper and lower bases 36, 26 together and to hold the intumescent material and fire ring in position with the ring tabs 38 extending outward a distance sufficient to be entrained in concrete during use. By entraining the ring tabs 38 in concrete, the intumescent material 34 is maintained in position even if the plastic used in the sleeve assembly 20 (especially bases 26, 36) and plumbing pipes melts or is burnt away. The fasteners passing through sockets 92 also more securely hold the inner sleeve 60 to the upper and lower bases 36, 26.

The outer sleeve 98 is connected to the inner sleeve 60 by aligning engaging posts 100 with channels 74 and moving the sleeves 60, 98 relative to each other until a desired height of the sleeve assembly 20 is achieved, at which point the outer and inner sleeves are rotated to engage the posts 100 with the selected adjacent grooves 70, 72 separated by end segments 76. Engaging protrusions 78 engage and hold the engaging posts 100 in position. Threaded fasteners through radial sockets 104 securely connect the inner and outer tubular sleeves 60, 98, respectively. The safety cap 102 is screwed onto the end of the outer sleeve 98. The distance from the bottom of the lower base 26 to the top of the outer sleeve 98 and safety cap 102 is thus predetermined. The whisker assembly 82 is removed from the support 80 and optionally connected to the connector 88 in the outside of the safety cap 102. The lower base 26 is fastened to a concrete support—typically by nails or screws passing through the base. As desired, the lower base 26 may be connected to CD plate 22 which in turn is fastened to a support such as a corrugated support by threaded fasteners. The lower base 26 is connected to the CD plate 22 or other support by threaded fasteners, or snap-lock mechanisms. The assembly 20 is then entrained in concrete, with the whisker assembly extending above the finished concrete surface to identify the location of the cap 102 and assembly 20 after the concrete surface is finished and hardened. The safety cap 102 is removed for use of the entrained sleeve assembly 20. A pipe is inserted through the opening in the flexible diaphragm 54 either from the top of the assembly, or from the bottom of the assembly, with the diaphragm resiliently urged against the outer surface of the pipe by the difference in sizes between the pipe and the opening in the diaphragm.

The above description provides an extended length sleeve assembly for thick concrete floors. For concrete floors with a smaller thickness a different cap may be used. Concrete floors with a thickness of 7.5 inches, 7.75 inches and 8 inches are common. It is cumbersome and labor intensive for a user to manually cut the inner sleeve 60 to the specific length needed for a particular concrete floor at a jobsite, and to do so accurately. If the tubular sleeve is cut too short, the entire sleeve cannot be used for that floor thickness and must be discarded to laboriously saved and inventoried for potential use with a different floor thickness. Sometimes the cap on the end of existing sleeves may have a threaded connection which allows the top surface of the cap to be extended above the top edge of the sleeve—but that provides a continuously variable height adjustment which is difficult to measure and which may be inadvertently changed if workers contact and rotate the cap (thereby changing its height). The second cap 120 provides an incremental adjustment for the height.

Referring to FIGS. 14A-14D, a second, incrementally positionable cap 120 is provided having a flat top, wrenching recesses 114 and female whisker connector 88—just as first cap 102. But the second cap 120 has a depending outer cap flange 122 at its outer periphery with at least one, and preferably a plurality of pairs of positioning tabs 124. The positioning tabs 124 may extend radially inward toward axis 21 and are located a predetermined distance below the top surface of the second cap 120. The positioning tabs 124 preferably have a top surface 126 that is inwardly and downwardly inclined and a flat bottom surface 128. The inclined top surface 126 is inclined at an acute angle relative to the bottom surface 128 so the inclined surface 126 faces an underside of the second cap 120. The positioning tabs 126 are sized to fit between the ridges 70, 72 and into the slots between those ridges.

During use, the tab 124 fits between two adjacent ridges in one of the sets of ridges 70 or 72. The flat bottom 182 rests on the lower of two adjacent ridges in the group of ridges 70 or 72 so that a downward force on the cap 120 presses the tab 126 against the lower of the two adjacent ridges to maintain the position of the cap and the inner tubular sleeve 60 to which the cap is connected. The tabs 124 are located to be spaced circumferentially around the outer cap flange a distance corresponding to the circumferential spacing of the vertical channels 72. The inner sleeve 60 is cut to the rough height needed—but at a location so that the total height of the lower base 26, upper base 36 and inner sleeve 60 is less than the slab thickness. The second cap 120 is rotated so the tabs 126 are aligned with different ones of the vertical channels 74a, 74b and the cap is then positioned axially relative to sleeve 60 so the tabs align with a pair of adjacent ridges in groups of ridges 70, 72, and the cap is then rotated so the tabs 126 slide into the space or groove between the desired ridges. Because the top of the second cap 120 is a known distance from the tabs 126 and the bottom surface 128 of the tabs, the location of the top surface of the cap 120 is also known. The ridges 70, 72 are preferably spaced in increments that allow the position of cap 120 to be manually adjusted to vary the total height of the sleeve assembly 20 to be 7.5, or 7.75 or 8 inches, preferably by engaging the tabs with three different, vertically adjacent ridges 70, 72 in the groups of ridges.

The tabs 124 are preferably at the bottom of the outer cap flange and the length of the flange determines how many grooves between the ridges 70, 72 may be engaged. The outer cap flange is preferably about 0.5 to 1-inch long. A longer length of outer cap flange limits the minimum height of the sleeve assembly 20. The shorter length flange (0.5 to 1 inch) allows adjustment for the most common thicknesses of the concrete floor. Advantageously, the flange is from 0.1 to 0.5 times the length of the inner sleeve 60. Optionally, radial flange sockets can be formed in the outer cap flange so threaded fasteners can be screwed through the outer cap flange and into the inner sleeve 60.

The upper surface of the positioning tabs 126 are inwardly and downwardly inclined so that they more easily slide off the upper ridge 70, 72 adjacent the tabs. After the concrete is poured and hardened, the outer cap flange is embedded in the concrete. A pipe may be inserted from below, through the diaphragm 54 and against the inside of the second cap 120 to force the cap out of the concrete. As seen in FIGS. 14A and 14D, the cap 120 preferably has an inner cap flange 130 radially inward from the outer cap flange 122 and parallel thereto and concentric therewith. The inner cap flange 130 is located to fit inside the inner surface of the inner tubular sleeve 60, preferably very close to that surface without binding. The inner flange 122 extends downward a distance that is about where the positioning tab 126 begins. As a pipe is pushed upward through the adjustable sleeve assembly and against the bottom of the second cap 120, the positioning tabs 124 will either shear off because of the concrete that fills the grooves between ridges 70, 27, or the positioning tabs 124 will deform and urge the top portion of the inner sleeve 60 inward. The inner flange 130 forms a ring that helps strengthen the top portion of the inner sleeve 60 and helps prevent the tabs 124 from pushing the top portion of the inner sleeve 60 inward and cracking the concrete or breaking the top portion of the inner sleeve. The inner flange 130 is believed optional, but is preferred.

The cap 120 thus has a circular outer periphery with a generally flat top surface and flange 120 depending from the outer periphery of the cap and encircling the periphery of the cap. The cap 120 is removed after the concrete deck is poured and advantageously, the top surface of the cap is at or very near the surface of the concrete deck so that little or no concrete overlays the cap 120. A "generally flat" top surface helps reduce the entrainment of the cap 120 and avoids outwardly extending protrusions that can engage the rotating blades of finishing trowels or other concrete finishing equipment, but allows recesses. The positioning tab 124 has a bottom surface that is orthogonal to the longitudinal axis 21 during use. The positioning tab 124 has a width that is smaller than the circumferential space W between the end segments 76 which forms a channel on the outer surface of the sleeve, which channel is generally parallel to the axis 21. The axial length of the positioning tab 124 is smaller than the axial distance between the outwardly extending ridges 70, 72 between which the positioning tab 124 fits during use. Advantageously there are between two and six positioning tabs, spaced so each tab fits along a different one of the channels between the end segments 76. The inner, depending cylindrical flange 130 has an outer diameter slightly smaller than the inner diameter of the tubular sleeve to which the cap 120 fastens.

Figure 17:
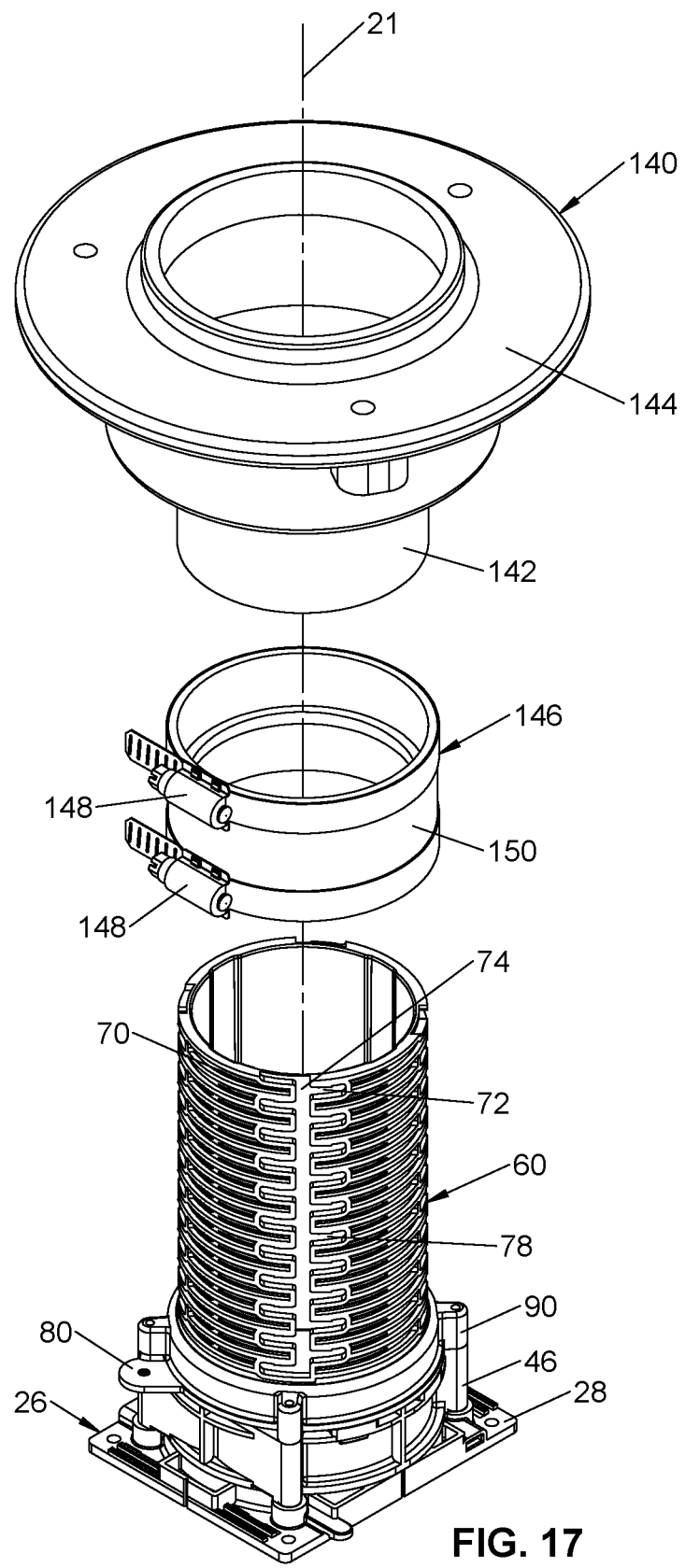
FIG. 17 is an exploded perspective view of an assembly having a drain fitting, no-hub connector and a sleeve assembly.
Figure 18:
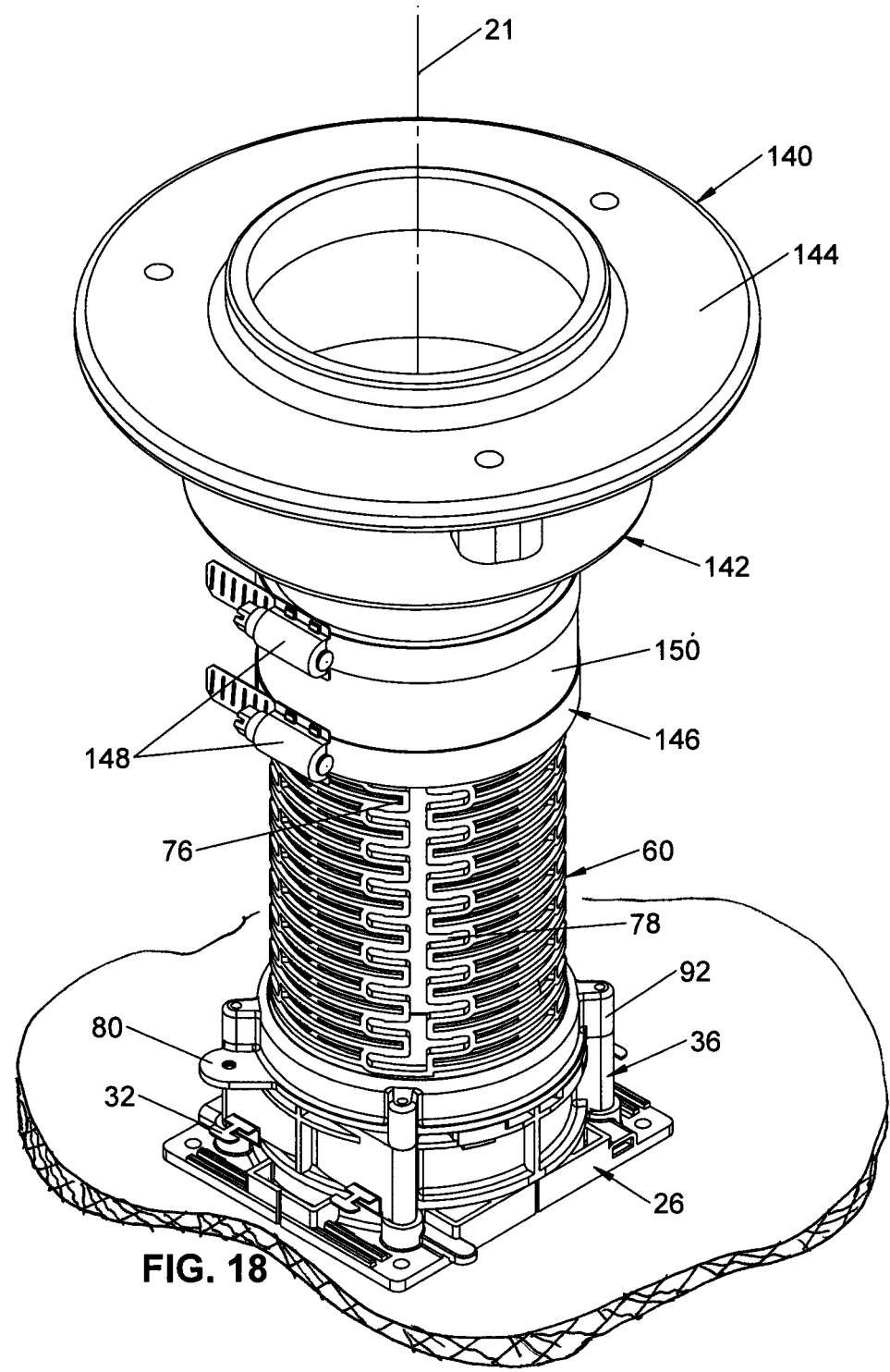
FIG. 18 is a perspective view of the assembly of FIG. 17.
Figure 19A:
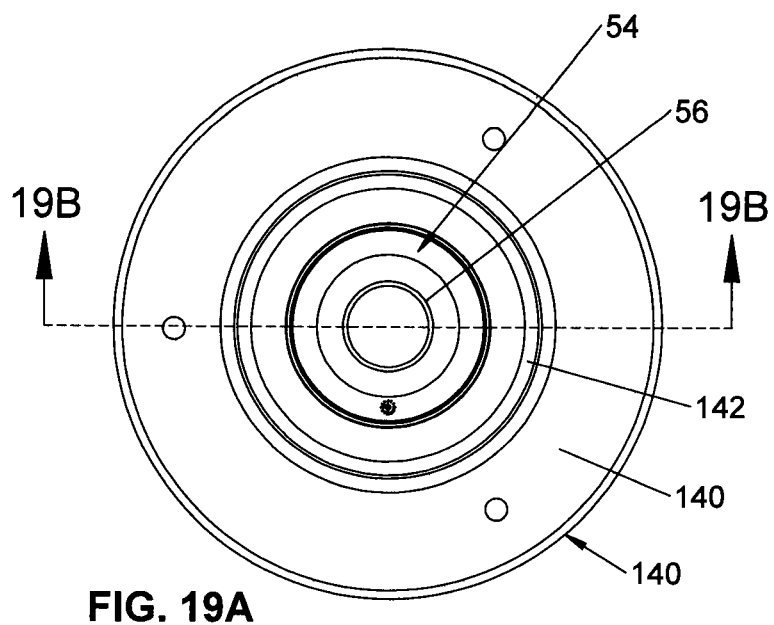
FIG. 19A is a top view of the assembly of FIG. 18.
Figure 19B:
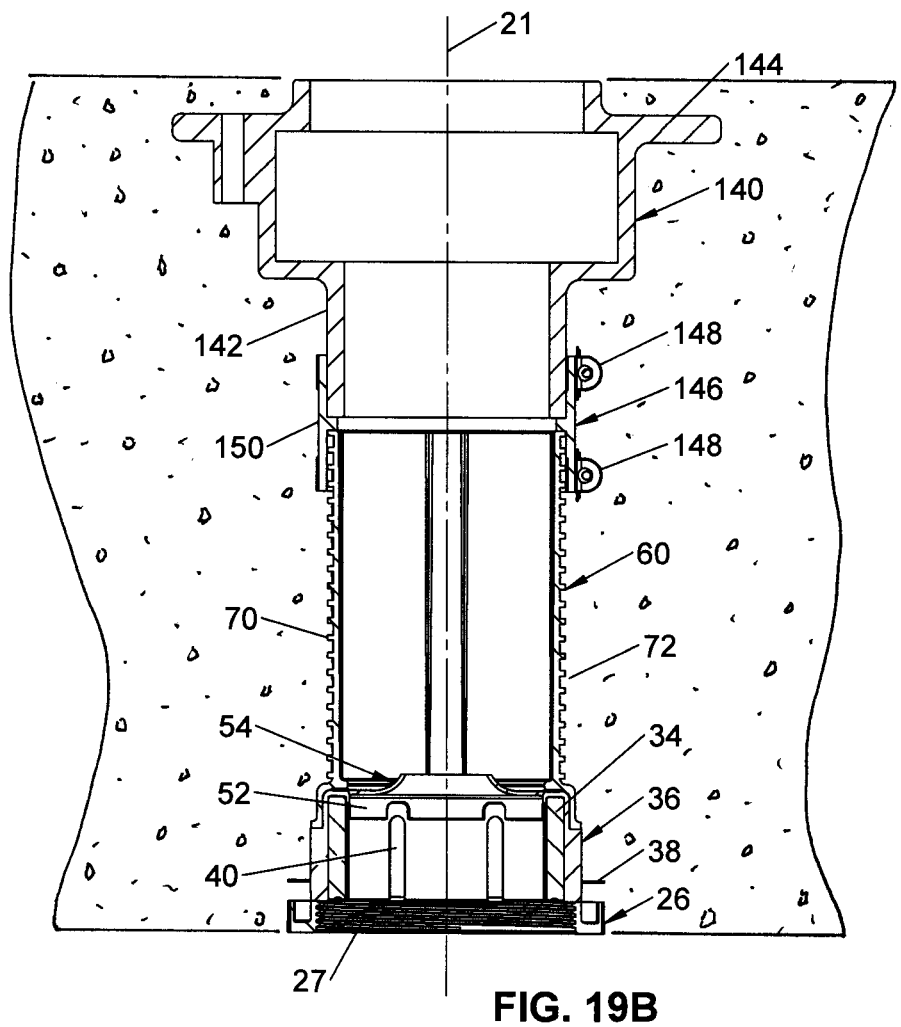
FIG. 19B is a sectional view of the assembly of FIG. 18 taken along section 19B-19B of FIG. 19A.
Figure 20A:
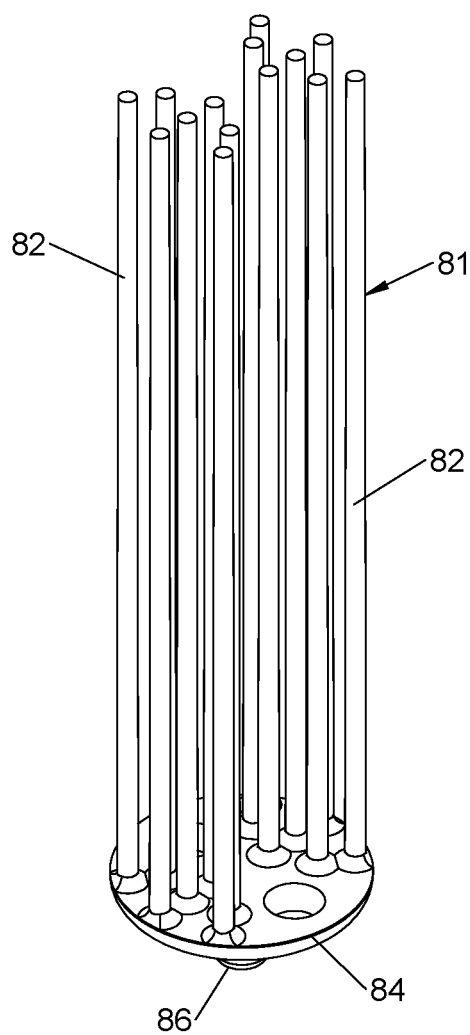
FIG. 20A is a top perspective view of a filament assembly.
Figure 20B:
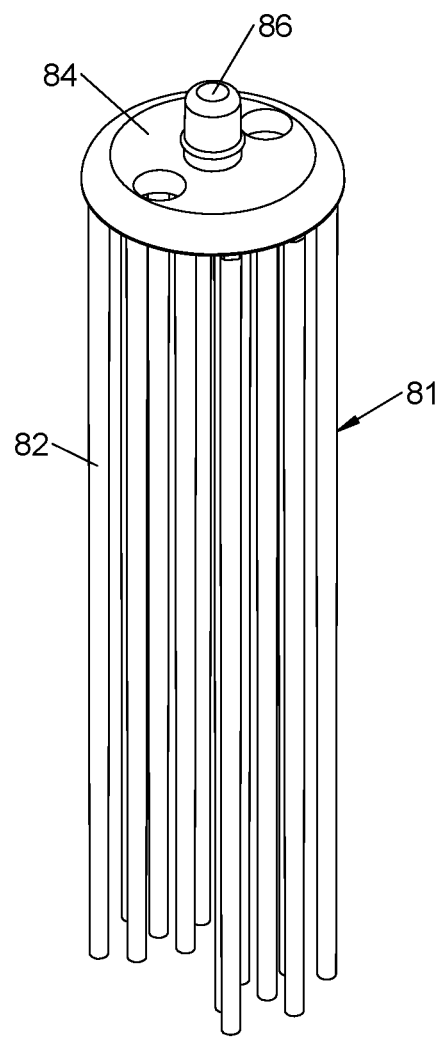
FIG. 20B is a bottom perspective view of the filament assembly of FIG. 20A

Referring to FIGS. 17-19, the extendable sleeve assembly 20 may be used with a no-hub connector 146 and a plumbing floor drain fitting 140 (e.g., drain fitting, toilet drain fitting) with a top flange 144 and a lower drain tube or spigot 142 to provide a sufficiently rigid assembly to be used in construction and while concrete is poured to entrain the parts. Currently, the extendable sleeve assembly 20 is fastened to a concrete form by screwing or nailing the lower base 26 to the concrete form, or fastening the lower base 26 to a CD plate 22 which is in turn nailed or screwed or otherwise fastened to a concrete form. After the extendable sleeve assembly 20 is fastened to a concrete form and adjusted to its desired height, a floor drain fitting 140 is positioned on top of the sleeve assembly 20 and held in position by metal rods and wires positioned in whatever way the user decides is most expedient to support the floor drain in position until the concrete is poured and hardened. Because these floor drain fittings 140 are heavy, typically of cast iron, the required support for these fittings is sturdy so as to position and support the floor drain fitting independent of the sleeve assembly 20. Typically, the floor drain fitting 140 has a lower tube 142 that fits inside the inner tubular sleeve 60 or outer tubular sleeve 98. Occasionally, the lower tube 142 abuts the end of those sleeves 60, 98 but that is undesirable because a good fluid connection is not ensured and pushing downward on the sleeve assembly 60 may cause it to tile and misalign, allowing concrete to enter the passage formed by the sleeve assembly. The floor fittings 140 are typically symmetric about the longitudinal axis 21.

The assemblies of FIGS. 1-16 and especially 17-19 may use a no-hub connector 146 to securely fasten the floor fitting 140 to the top of the sleeve assembly 20 such that the sleeve assembly self supports the drain fitting during pouring of the concrete and finishing with no support struts, wires or braces extending between the support on which the concrete is poured and any part of the base, sleeve, no-hub connector or floor fitting to stabilize the parts as concrete is poured, finished and sets. The no-hub connector 146 may have a cylindrical body with opposing ends and a radially compressing mechanism at each opposing end to move the ends radially inward to seal against another part. The depicted no-hub connector 146 is a tubular body 150 with inwardly deformable ends. A ring clamp 148 encircles each end of the tubular body 150. More than one ring clamp may be used on each end of the tubular body. A thick, rubber hose is typically used to form the body 150, with a thick, stiff hose, and/or a metal sheath around the tube and between the ring clamps to stiffen the body 150 at the central part of the body. The metal sheath typically comprises a cylindrical shape with a lengthwise slot to allow the diameter to change as the connector is tightened, and with outwardly curved or rolled ends to avoid cutting into connected parts. A first end of the connector 146 fits over the outer end of the inner tubular sleeve 60 (or outer tubular sleeve 98) and a second end of the connector 146 fits over the tube 142 of the floor drain fitting 140. The ring clamps 148 are tightened to squeeze the body 150 against the sleeve 60 (or 98) and tube 142 to form a tight connection. A slotted metal sheath may encircle the tubular body and the slot allows the sheath to contract as the ring clamps are tightened, with the metal sheath providing axial support to stabilize the floor fitting.

In the described embodiments for use with the sleeve assembly 20, the no-hub connector 146 allows a small lateral offset of the joined tubes, allows a small axial offset of the joined tubes, and allows tubes of different diameter to be joined if the difference in diameters is small enough, all while maintaining a desired alignment of the parts. The body 150 is advantageously of rubber, EDPM, polyisoprene, including silicon rubber, or other suitably stiff but resiliently deformable materials that are stiff enough and optionally have a high enough sliding friction coefficient to maintain the position and orientation of the clamped tubular parts without noticeable creep when creep is measured over a few days. Thus, the position and orientation of a floor fitting 140 having a lateral dimension of about 12 inches, is believed to be maintained within about 0.1 inch of the initial position when concrete is poured and within about 0.15 inches after finishing, along the X axis, along the Y axis, and along the Z axis.

The length of the no-hub connector 146 and the stiffness of the connector are selected to provide a sufficiently strong and stiff support that the weight of the floor drain fitting 140 may be supported in its use position by the no-hub connector—without the need for further support as in the prior art, from, for example, support wires or struts on the floor drain fitting 140. Thus, the floor drain fitting 140 is supported on the support sheet or corrugated deck onto which the concrete deck is poured, only by the base (26, 36 and 22 if a CD is used), sleeve 60 and the no-hub coupler 146. The normal connection of the base 26, 36 or other base to the support (typically plywood or CD) onto which the concrete is poured is believed sufficient, such as nails or threaded fasteners or bolts on CD. As desired, additional fasteners may be used to connect the base 26 or CD plate 22 to the support onto which concrete is poured to form the concrete deck. But no external braces, wires or support struts extending between the support on which the concrete is poured, and the parts of the tubular passage formed by the base, sleeve(s), no-hub connector and floor fitting.

The top flange 144 typically has plumbing connections on it and must be parallel to the concrete surface, and the no-hub connector 146, sleeve 60 and base 26, 36, must maintain the desired position and orientation of the floor drain fitting 140. The floor drain fitting 140 is typically made of cast iron and very heavy and the no-hub connector 60 must maintain the desired position and orientation of the floor drain fitting 140. Advantageously, Advantageously, the diameter of the inner tubular sleeve 60 is selected to be about the same diameter of the no hub connector 146 so that a body 150 of uniform diameter may be used for the connector 146. In this context, "about the same diameter" means within 10% of the largest outer diameter. Thus, if the largest outer diameter of two tubes is 2 inches, about the same diameter allows a plus or minus 0.2 inch variation between the two tubes. If the differences between the floor drain fitting outlet tube 142 and the tubular sleeves 60, 93 are great enough then a connector 146 may be selected which has a body 150 that changes diameter from one end to the other, although advantageously a change in diameter of more than one inch is not desirable. The threaded fasteners extending through the lower base sockets 28, the upper base sockets 46, and the sockets 92 on the sleeve 60, connect the sleeve and base together to form a strong and stiff structure that is believed to help maintain the position and orientation of the floor fitting 140 and its top flange 144. Securing the threaded fasteners passing through these sockets 28, 46 and 92 to the support onto which the concrete is poured to form the deck, anchors these connected base and sleeve parts to provide a sturdy support for the no-hub connector 146 and floor fitting 140.

The assembly and use sequence is modified slightly when a floor fitting 140 is supported by the sleeve assembly 20 as no cap 102 or 120 is required because the floor fitting 140 is connected by the no-hub connector 146 to the top end of the sleeve 60 or to any extended sleeve as by outer sleeve 98. But the floor fitting itself is covered to prevent concrete from entering it so a cap or cover of sorts is provided and that floor fitting cover may have be configured to have the whisker assembly 81 removably connected to the fitting cover so the cover may be more easily located after finishing of the concrete. The floor fitting cover is advantageously flat (excluding the whisker assembly connected to the cover) so it does not engage the concrete finishing tools and mar the concrete surface or be damaged by those finishing tools.

If only the inner sleeve 60 is used, then the floor fitting 140 has its tube or spigot 142 fit inside the top end of the no-hub connector 146 while the top end of the sleeve 60 fits inside the bottom end of the no-hub connector 146. The ring clamps 148 are then tightened while the floor fitting 140 is held in its desired position and orientation. Advantageously the top flange 144 is parallel with the anticipated exterior surface of the concrete deck, and the floor fitting tube or spigot 142 and no hub connector 146 are both aligned with the longitudinal axis, as is the sleeve 60 and base parts 26, 46. The base 26 is fastened to the support and concrete is poured onto the support, advantageously with the floor fitting 140 covered so concrete does not enter it during pouring the concrete deck or finishing the exterior surface of the deck.

This assembly of the floor fitting 140, no-hub connector 146, sleeve 60, along with the upper and lower base 36, 26 is advantageously arranged and aligned along a common longitudinal axis 21 while the lower base 26 is fastened to the support onto which the concrete is poured to form the deck. That support is typically a series of plywood sheets, a metal CD, or other support. Alternatively, the assembly of the floor fitting 140, connector 146, sleeve 60 and base parts 26, 36 may be created and connected separately, and then fastened to the support onto which the concrete deck is poured, be it, by fastening the lower base 26 to the support.

The lower base 26, upper base and seal assembly 36 and inner tubular sleeve are connected axially by latch and catch, snap-fit connections. Preferably, the lower base 26 also connects to the CD plate 22 by latch and catch, snap-fit connections. The threaded fasteners may be used to provide a more secure connection, but may be omitted. Advantageously though, the sleeve 60, upper base 36 and lower base 26 are connected not just by snap-fit connections, but are further connected by threaded fasteners through the sockets 92, 46 and 28 in those respective parts. A threaded fastener such as a bolt with one end above socket 92 and the other end below base 26 and socket 28 may be used to interconnect these parts and hold them securely together, and the connected parts may then be fastened to the support for the concrete deck by fasteners passing through the lower base 26. Alternatively, one head of the bolt may be on the bottom side of the support for the poured concrete deck, be that a sheet of plywood or a corrugated deck ("CD") to fasten the base and sleeve more directly to the support for the poured concrete. To fasten the sleeve assembly to the support for the concrete deck does not require a bolt, as a threaded fastener such as a screw may pass through the sockets 92, 46 and 28 and also through the support for the poured concrete deck, be that a sheet of plywood or a corrugated deck ("CD") so as to more directly fasten the sleeve 60, and housing parts 26, 36 together and to the support for the concrete surface. These above connections may be used regardless of whether a floor fitting 140 is used.

If the poured deck is thicker than provided by the base parts 26, 36, sleeve 60, no-hub fitting 150 and floor fitting 140, the length may be increased by either or both of using a longer no-hub connector 146 or adding a second sleeve. Advantageously, the no-hub connector 146 is relatively short, typically four 4 to 8 inches long and advantageously about 4 to 6 inches long. The longer connectors 146 use multiple ring clamps 148 on each end of the connector. A stiffening sheath of metal or plastic may be used between the ring clamps 148 and body 150 to stiffen the no-hub connector 146 and stabilize the floor fitting 140. If the body 150 is thicker and the stiffening sheath strong enough, a few inches of length may be obtained by using a stiffening sheath on the no-hub connector. Even if added length is not needed, the stiffening sheath may be used to further strengthen and stiffen the no-hub connector.

Alternatively, a thicker deck with the fitting assembly 20 supporting the floor fitting 140 may be achieved by using an extended sleeve, such as the second sleeve 98. The connection between inner sleeve 60 and the outer sleeve 98 must be sufficiently strong and stiff to support the added weight of the floor fitting 140 without additional stabilizing and support devices such as wires, rods, etc. A sufficiently strong and stable connection is believed to be formed providing mating threads on mating ends of the inner and outer sleeves for an incremental extension of length, or by fitting the outer sleeve over the inner sleeve and using the engaging posts 100 mating with ridges 170, 172 to adjust the length, and then using threaded fasteners passing through radial sockets 104 to interconnect the overlapping portions of the inner and outer sleeves.

The diameter of the end of the sleeve 60, 98 and the diameter of the floor fitting tube or spigot 142 are advantageously about the same. Any slight differences in diameter may be accommodated by combining inner and outer sleeves 60, 98, recognizing that outer sleeve 98 is slightly larger in diameter than inner sleeve 60, and using threaded fasteners to connect the two sleeves allows not only an adjustable length but a strong and stable interconnection between the sleeves. Further adjustment in diameter may be achieved by using the adaptor 160, described above, which may have a selected outer diameter. Radial sockets 104 may be provided to the adaptor 160, to the top portion of inner sleeve 60, or to both to accommodate threaded fasteners passing through the adaptor 160 and into the sleeve 60 to interconnect, strengthen and stabilize the connection. The no-hub connector 146 may also accommodate some change in diameter, and if a connector 146 is used with a non-uniform diameter along the length of its body 150, then advantageously the bottom end of the no-hub connector 146 is of larger diameter than the top end of the connector 146, with the ring clamps 148 being of appropriate diameter for use with the respective connector ends of different diameter.

After the extendable sleeve assembly 20 is connected to the no-hub connector 146 and floor fitting 140, and the base 26 or CD plate 22 is connected to the support onto which the concrete is poured, the height and orientation of the floor fitting and any flange 144 is set, by moving the extendable sleeve assembly, the no-hub connector 146 and floor fitting. The extendable sleeve assembly 20 is believed to be sufficiently stiff and stable when fastened to the support onto which concrete is poured that it doesn't shift laterally or angularly, and it allows a stable height adjustment and position to be set. The no-hub connector 146 allows some small adjustment in height and allows adjustment in orientation of the floor fitting flange 144, with tightening of the ring clamps 148 fixing the orientation and height. The resulting assembly, when tightened and positioned, is believed sufficiently stable to allow concrete to be poured and entrain the assembled and oriented parts and to maintain the alignment and orientation of the parts as the concrete cures and is finished—without the need for additional wires or inclined support struts to brace the heavy floor fitting in position. The base, sleeve and no-hub connector are thus self-supporting of the floor fitting so the floor fitting top flange is substantially perpendicular to the longitudinal axis. The impact forces of workers hitting the sleeve assembly 20 supporting the floor fitting 140 may shift the position or orientation of the floor fitting, thus, the orientation and position are advantageously checked shortly before pouring concrete to entrain the fitting assembly and floor fitting. The that position and orientation are believed to be maintained during pouring and curing of the concrete, and absent unusual circumstances, during finishing of the concrete surface.

The floor fitting flange 144 is typically substantially perpendicular to the longitudinal axis. The floor fitting flange 144 may be slightly inclined as the exterior surface of the concrete deck may be slightly inclined by about 1-3° for drainage, and "substantially perpendicular" is used to encompass this variation for drainage. If the floor fitting 140 is intentionally orientated with the flange 140 at a greater inclination, the sleeve assembly 20 and no-hub connector 140 described herein are believed sufficient to maintain that orientation. The sleeve assembly 20 and no-hub connector 140 are not intended for supporting the floor fitting 146 at any appreciable distance offset laterally from the longitudinal axis or for supporting a floor fitting 146 that is sufficiently asymmetric that it has its center of gravity offset substantially from the longitudinal axis 21. It is believed the sleeve assembly 20 and no-hub connector 140 can support a floor fitting 140 of 50 pounds with a center of gravity offset laterally a distance of about 0.5 inches from the longitudinal axis 21. But preferably the weight and center of gravity offset from the longitudinal axis 21 are about 25 pounds or less, offset laterally about 0.5 inches or less. When the center of gravity of the floor fitting is within the above offset distances, the floor fitting is substantially centered on the longitudinal axis 21. There is thus provided a method and apparatus for self-supporting a floor fitting by an extendable sleeve assembly using a no-hub connector, during pouring of the concrete, and advantageously during finishing of the concrete surface.

Figure 16:
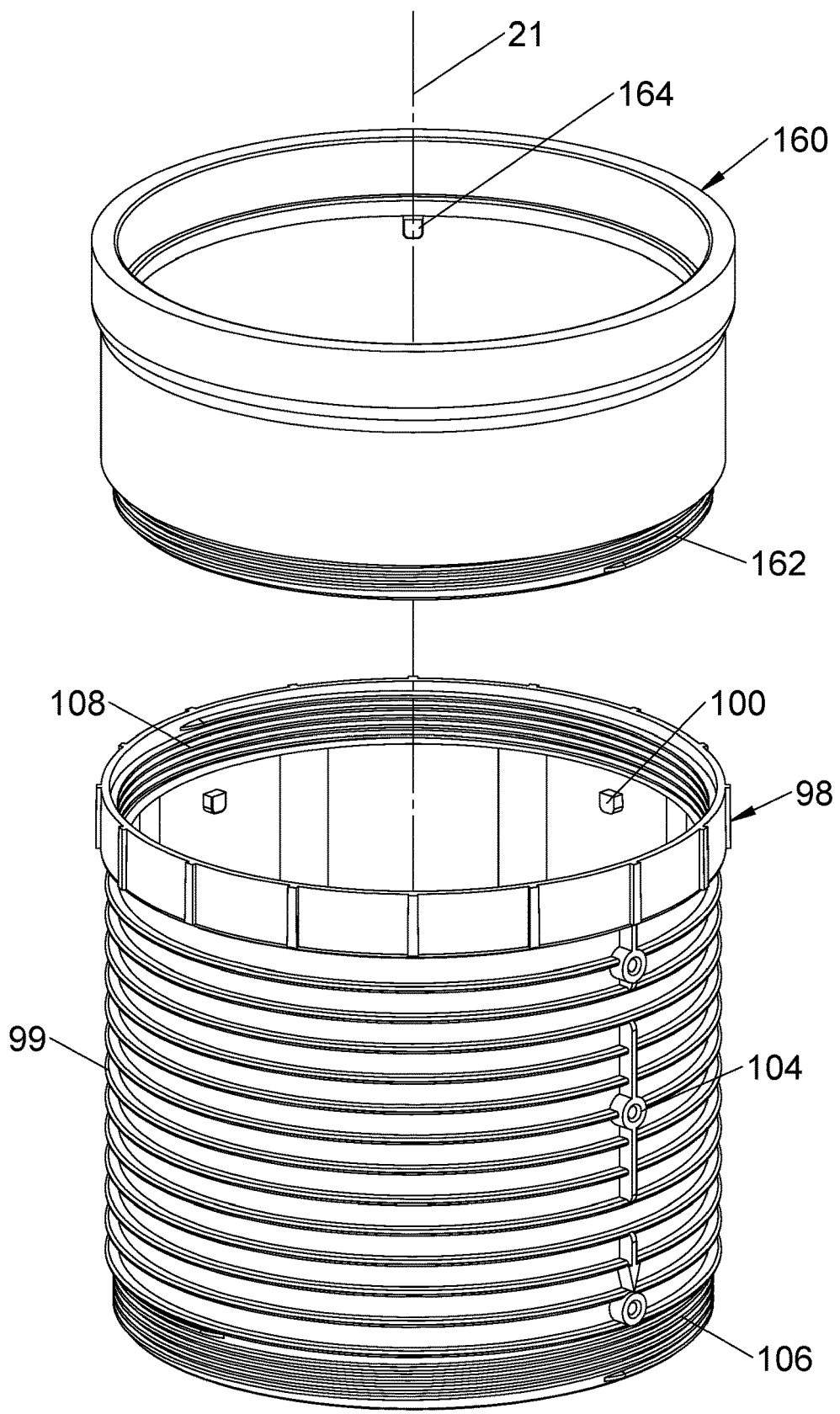
FIG. 16 is an exploded perspective view of the short adapter of FIG. 15A on an outer sleeve.

Referring to FIGS. 15-16, an adapter 160 is shown for changing the diameter of the extendable sleeve assembly 20. The adapter has a first end with external adapter threads 162 and inwardly extending positioning tabs 164. An outwardly extending portion 166 shown as a radial extending shoulder which then extends upward to form larger diameter sidewall 168 of the adapter. The positioning tabs 164 are located circumferentially to fit into vertical columns 74. The positioning tabs 164 slide vertically in columns 74 until the top of the adaptor is at the desired height and then the adaptor is rotated about axis 21 to fit the positioning tabs 164 into the desired space between the groups of ridges 70, 72 on the outside of the inner tubular sleeve 60. This arrangement allows a larger diameter than the inner sleeve 60 to be attached to the inner sleeve.

As seen in FIGS. 15-16, the adapter 160 may be inverted so that the external adapter threads 162 engage the internal threads 108 on the top end of the outer tubular sleeve 98. In this orientation, the adapter 160 provides a larger diameter sleeve on the end of the outer sleeve 98. The adapter 160 has a fixed height, but the overall height of the sleeve assembly 20 may be adjusted by adjusting the position of the outer sleeve 98 on the inner sleeve 60.

Referring to FIGS. 11A-11B, an optional aerator box 170 bay be releasably connected to the bottom of the lower base 26. The lower base 26 has internal threads 27 (FIG. 3) which may threadingly engage external threads on the upper end of the aerator box 170. The aerator box 170 has an outwardly extending flange 172 with optional fastener holes in the flange. Fasteners may connect the aerator box 170 to a concrete form to position the intumescent ring 34 further into the thickness of the concrete slab or deck, and to allow an enlarged recess or cavity on what is typically the lower surface of the slab or deck. The general configuration of the aerator box 170 may be cylindrical or it may have various flat sided shapes, or combinations of curved and flat sides.

Figure 21A:
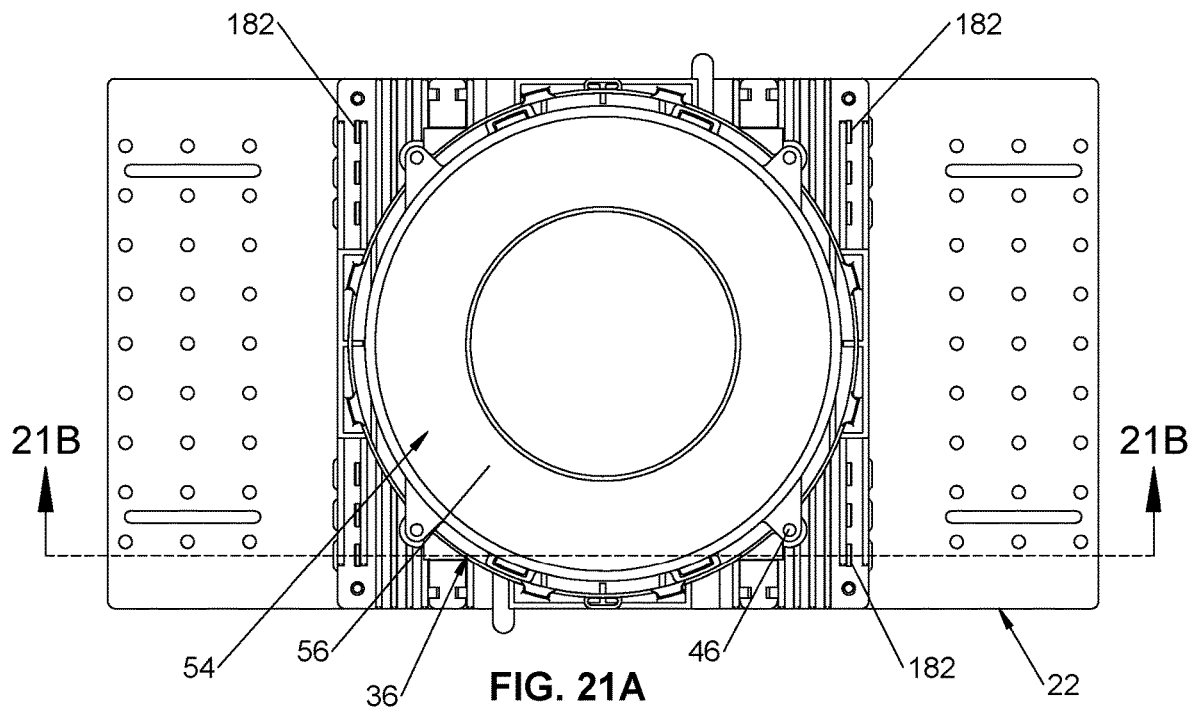
FIG. 21A is a top view of an upper and lower base on a CD plate.
Figure 21B:
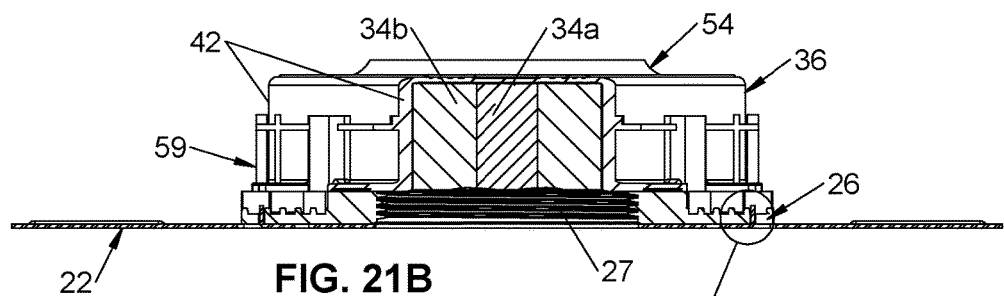
FIG. 21B is a partial sectional view taken along section 21B-21B of FIG. 21A.
Figure 21C:
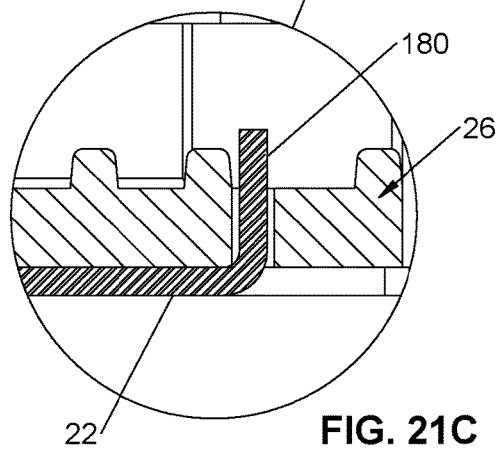
FIG. 21C is an enlarged portion of FIG. 21B showing an interconnection between the CD plate and lower base.

Referring to FIGS. 21A-21C, the CD plate may have various upward extending projections 180 each fitting into a different one of plural slots 182 in the lower base 26 in order to interconnect the CD plate 22 and lower base 26. The projections 180 are preferably upwardly bent portions of a metal CD plate 22 or molded projections of a plastic CD plate and restrain relative lateral movement and rotation in the plane of the CD plate between the lower base 26 and the CD plate 22. Other connections could be used, including threaded fasteners to interconnect the parts.

There is advantageously provided a method of forming a fluid passage through a concrete deck poured onto a support using an extendable sleeve assembly 20 and to self-support a floor fitting 140 with a flange 144 at the finished concrete surface using the fitting assembly 20 and a no hub-connector 146. The lower base is fastened to the upper base and seal assembly 36 by snap lock fittings and then fastened to the support onto which the concrete is poured. If that support is a corrugated deck that the lower base 26 is snap fit to CD plate 22. If that support is the typical plywood support than fasteners are passed through fastener holes in the base 26, where the fasteners typically comprise threaded fasteners or nails. The sleeve 60 may be snap-fit to the upper base and seal assembly 36 before after the lower base 26 is connected to the support onto which the concrete is poured. As needed, an outer sleeve 98 or an adapter 160 is connected to the base or the sleeve 60, advantageously using threaded connections or threaded fasteners as described herein. Advantageously, threaded fasteners pass through aligned sockets 28, 46, 29 and into or CD plate 22 or the support onto which concrete is poured. A cap 102, 120 is placed over the open end of the extendable sleeve assembly 20. The height of the sleeve 60 or 98 is adjusted to the desired height, the vertical alignment of axis 21 is checked and the parts adjusted as needed—although only small adjustments are needed. One or more wedges may be inserted between the base and support or the CD plate and the support to adjust the orientation of axis 21. The cap may be added before or after the height adjustment. The whisker assembly 81 is likewise connected to the cap sometime before concrete is poured. After verifying alignment to the extent needed (not all decks require the same alignment), the concrete is poured, the concrete surface finished and the slab or deck of concrete is allowed to cure enough to walk on, preferably without marking the surface permanently. The whiskers identify the location of the cap, which is usually flush with the concrete surface or slightly below the concrete surface. The cap is removed, typically by pushing it upward and off by inserting a pipe from below and through the fitting assembly 20.

If a drain fitting 140 is used, then the assembly 22 is as above, it the cap 102, 120 are omitted and a different cap, shaped to connect to and extend over and cover the parts of the drain fitting which are to be exposed after the concrete is finished. The floor fitting cover is not described in detail but such covers are known in the art. The above method adds a no-hub coupling 146 to the top end of the extendable sleeve assembly, whether that top end is formed by the inner sleeve 60, the outer sleeve 98, or the adapter 160. The bottom end of the tubular body 150 fits over the top end of the sleeve, 60 or 98 or fits over the adapter 160 while the top end of the tubular body 150 fits over the floor fitting tube or spigot 142, and the ring clamps 148 are tightened. The floor fitting 140 may be connected to the no-hub connector 146 before or after connector 146 is connected to the extendable sleeve assembly 20. As the ring clamps 198 are tightened height, location and orientation of the floor fitting 140 and its top flange 144 are checked and adjusted as needed, with the ring clamps 148 tightened to hold the floor fitting and its flange in the desired position. No wires, support struts or brackets are believed needed to maintain the position of the floor fitting 140 and its top flange 144. Depending on the activity around the assembly or how long it has been since the assembly was aligned, the position of the floor fitting and its top flange may be rechecked shortly before concrete is poured. Concrete is then poured, finished and the concrete deck or slab cured until it can be walked on without permanent deformation of the surface. The cover over the floor fitting 140 is then removed, either from the exterior, finished surface of the concrete or by pushing a rod through the extendable sleeve assembly 20, no-hub fitting 146 and floor fitting 140. When the floor fitting 140 is connected to the extendable sleeve assembly, it is preferred to have threaded fasteners pass through aligned sockets 28, 46, 29 and into or CD plate 22 and/or into the support onto which concrete is poured to connect the parts to the support.

The various parts of the sleeve assembly 20, the no-hub coupling 146 and even the floor fitting 140 may all be included in a kit, or any subset of these parts may be included in a kit.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention, including various ways of configuring the latch members and catches that hold the parts together. Further, the various features of this invention can be used alone, or in varying combinations with each other and are not intended to be limited to the specific combination described herein. Thus, the invention is not to be limited by the illustrated embodiments.

What is claimed is:

1. A diaphragm seal assembly for use with a base connected to a tubular sleeve having a cylindrical wall with an internal diameter D, the sleeve extending along a longitudinal axis for forming a passage through a poured concrete deck formed on a support surface, the assembly having a flexible diaphragm seal with a circular opening on the longitudinal axis sized to allow passage of an elongated member while flexibly engaging an outer surface of that elongated member, comprising:

an annular seal housing having a sidewall extending along and encircling the longitudinal axis and having an annular top plate extending inward toward the longitudinal axis with a central opening at the axis that is larger in diameter than the circular opening of the diaphragm seal, the top plate having a surface which is textured and which encircles the longitudinal axis; and wherein the flexible diaphragm seal has an inner diameter defining the circular opening and also has an over-molded outer diameter that extends over the textured surface and around the longitudinal axis so that the textured surface and the top plate are connected to the flexible diaphragm by over molding that outer diameter to that textured surface.

2. The diaphragm seal assembly of claim 1, wherein the textured surface is on a top surface of the top plate.

3. The diaphragm seal assembly of claim 1, wherein the top surface extends radially inward.

4. The diaphragm seal assembly of claim 3, wherein the flexible diaphragm has a funnel shape extending out of a plane orthogonal to the longitudinal axis through the textured surface when the diaphragm is in an undeformed condition.

5. The diaphragm seal assembly of claim 4, wherein the funnel shape has straight walls forming a frusto-conical shape between the top plate and the inner diameter of the diaphragm, and extends toward a distal end of the tubular sleeve during use.

6. The diaphragm seal assembly of claim 4, wherein the funnel shape has curved walls.

7. The diaphragm seal assembly of claim 6, wherein the curved walls extend toward a distal end of the tubular sleeve during use.

8. The diaphragm seal of claim 4, wherein the seal housing sidewall extends in an axial direction opposite the funnel shape.

9. The diaphragm seal assembly of claim 4, wherein the seal housing sidewall has a plurality of latch members extending parallel to the longitudinal axis in a direction away from a direction in which the flexible diaphragm extends.

10. The diaphragm seal assembly of claim 4, wherein the seal housing sidewall is connected to a base extending along the longitudinal axis and enclosing a fire ring of intumescent material that encircles the longitudinal axis.

11. The diaphragm seal assembly of claim 10, wherein the seal housing sidewall connects to the base by a plurality of snap-lock connections.

12. The diaphragm seal assembly of claim 11, further comprising a plurality of threaded fasteners connecting the seal housing sidewall to the base.

13. The diaphragm seal assembly of claim 11, further comprising the tubular sleeve, with a plurality of threaded fasteners extending between the tubular sleeve and the base.

14. The diaphragm seal assembly of claim 11, further comprising the tubular sleeve, and wherein the tubular sleeve, seal housing sidewall and base each have a socket, with a plurality of threaded fasteners extending through the sockets to connect the tubular sleeve, seal housing sidewall and base together.

15. The diaphragm seal assembly of claim 14, further comprising the tubular sleeve, and wherein the tubular sleeve is connected to the seal housing sidewall by snap lock connections, and wherein the seal housing sidewall is connected to the base by snap lock connections.

16. The diaphragm seal assembly of claim 11, further comprising the tubular sleeve, and wherein the tubular sleeve is connected to the seal housing sidewall by snap lock connections, and wherein the seal housing sidewall is connected to the base by snap lock connections.

17. The diaphragm seal assembly of claim 11, further comprising the tubular sleeve, and wherein a bottom of the tubular sleeve has a textured surface directly contacting the over-molded surface on the outer diameter of the top plate.

18. The diaphragm seal assembly of claim 11, wherein the textured surface comprises a plurality of concentric grooves.

19. The diaphragm seal assembly of claim 1, wherein the textured surface comprises a plurality of concentric grooves.

* * * * *